(12) United States Patent
Peshkin et al.

(10) Patent No.: US 10,379,616 B2
(45) Date of Patent: Aug. 13, 2019

(54) HAPTIC DISPLAY WITH SIMULTANEOUS SENSING AND ACTUATION

(71) Applicants: Tanvas, Inc., Chicago, IL (US); Northwestern University, Evanston, IL (US)

(72) Inventors: Michael A. Peshkin, Evanston, IL (US); James E. Colgate, Evanston, IL (US); Michael F. D. Olley, Lake Zurich, IL (US)

(73) Assignees: Northwestern University, Evanston, IL (US); Tanvas, Inc., Chicago, IL (US)

( * ) Notice: Subject to any disclaimer, the term of this patent is extended or adjusted under 35 U.S.C. 154(b) by 0 days.

(21) Appl. No.: 15/117,128

(22) PCT Filed: Feb. 20, 2015

(86) PCT No.: PCT/US2015/016906
§ 371 (c)(1),
(2) Date: Aug. 5, 2016

(87) PCT Pub. No.: WO2015/127270
PCT Pub. Date: Aug. 27, 2015

(65) Prior Publication Data
US 2017/0168572 A1   Jun. 15, 2017

Related U.S. Application Data
(60) Provisional application No. 61/942,983, filed on Feb. 21, 2014.

(51) Int. Cl.
*G06F 3/01* (2006.01)
*G06F 3/041* (2006.01)
*G06F 3/044* (2006.01)

(52) U.S. Cl.
CPC .............. *G06F 3/016* (2013.01); *G06F 3/044* (2013.01); *G06F 3/0416* (2013.01)

(58) Field of Classification Search
CPC .................................. G06F 3/016; G06F 3/044
See application file for complete search history.

(56) References Cited

U.S. PATENT DOCUMENTS

| 8,253,306 B2 | 8/2012 | Morishima et al. |
| 2011/0074733 A1* | 3/2011 | Makinen .............. G09B 21/004 345/174 |

(Continued)

FOREIGN PATENT DOCUMENTS

WO   WO 2012039876 A2   3/2012

*Primary Examiner* — Lixi C Simpson
(74) *Attorney, Agent, or Firm* — Vedder Price P.C.

(57) ABSTRACT

Touch interface devices and methods for producing multi-point haptics utilizing simultaneous sensing and actuation are disclosed. In one configuration, one or more electrodes connected to a front surface of a substrate are arranged in a pattern and connected to an electronic controller configured to produce a haptic effect by applying one or more voltages to the electrodes, and measure the locations of one or more touch points by applying one or more voltages to the electrodes. In another configuration the electronic controller is configured to produce a haptic effect by applying positive and/or negative voltages to the electrodes, and measure the locations of one or more touch points by applying positive and/or negative voltages to the electrodes. Also disclosed is a method for using a single set of electrodes on a substrate of a touch interface to simultaneously produce haptic effects on the substrate and measure finger locations relative to the substrate.

19 Claims, 14 Drawing Sheets

(56) References Cited

U.S. PATENT DOCUMENTS

| | | | |
|---|---|---|---|
| 2011/0279250 A1* | 11/2011 | Ryhanen | G06F 3/016 340/407.2 |
| 2011/0298758 A1 | 12/2011 | Hsieh et al. | |
| 2012/0068957 A1* | 3/2012 | Puskarich | G06F 3/016 345/174 |
| 2012/0105333 A1* | 5/2012 | Maschmeyer | G06F 3/016 345/173 |
| 2012/0287068 A1* | 11/2012 | Colgate | G06F 3/016 345/173 |
| 2012/0313682 A1 | 12/2012 | Sprentall et al. | |
| 2013/0106765 A1* | 5/2013 | Beecher | G06F 3/044 345/174 |
| 2013/0147758 A1* | 6/2013 | Chang | G06F 3/044 345/174 |
| 2013/0154973 A1* | 6/2013 | Tung | G06F 3/041 345/173 |
| 2013/0307789 A1* | 11/2013 | Karamath | G06F 3/016 345/173 |
| 2014/0071088 A1* | 3/2014 | Hong | G06F 3/0416 345/174 |
| 2014/0225844 A1* | 8/2014 | Tada | G06F 3/016 345/173 |
| 2015/0061703 A1* | 3/2015 | Jiang | G06F 3/044 324/686 |

\* cited by examiner

HAPTIC DISPLAY WITH SIMULTANEOUS SENSING AND ACTUATION

CROSS-REFERENCE TO RELATED APPLICATION

This application claims the benefit and priority of U.S. Provisional Patent Application Ser. No. 61/942,983, filed Feb. 21, 2014, the disclosure of which is hereby incorporated herein by reference in its entirety.

CONTRACTUAL ORIGIN OF THE INVENTION

This invention was made with government support under grant numbers IIS-0964075 and IIP-1330966 awarded by the National Science Foundation. The government has certain rights in the invention.

FIELD OF THE INVENTION

The present invention generally relates to touch interfaces for surface haptic devices (SHD), and more particularly to touch interfaces having simultaneous sensing and actuation that can provide multi-point haptics, which includes providing independent haptic effects experienced by separate fingers of a user.

BACKGROUND OF THE INVENTION

Touch interfaces can be found in laptop computers, gaming devices, automobile dashboards, kiosks, operating rooms, factories, automatic tellers, and a host of portable devices such as cameras and phones. Touch interfaces provide flexible interaction possibilities that discrete mechanical controls do not. But today's touch interfaces sacrifice an important part of the human experience: haptics. "Haptics" refers to the perceptual system associated with touch. Haptics lets us touch type, find a light switch in the dark, wield a knife and fork, enjoy petting a dog or holding our spouse's hand. Haptics is not just about moving one's hands, but it is about feeling things, recognizing objects (even without looking at them), and controlling the way that we interact with the world.

Haptics in the form of vibration is a familiar feature of electronic products such as pagers, cell phones, and smart phones. Although vibration has long been used as a silent ringer or alarm, it is increasingly used to provide tactile feedback to the human hand (especially the fingertips) when using a touch surface, such as a touch screen. Prior art, such as U.S. Pat. No. 6,429,846 entitled, "Haptic Feedback for Touchpads and Other Touch Controls", for instance, describe a number of hardware and software solutions for vibration-based haptic feedback. The technology is considerably more advanced than what was traditionally used in pagers. The use of piezoelectric actuators to enable high bandwidth control of vibration profiles enhances the use experience. Nonetheless, the vibration approach has certain drawbacks. For instance, the entire device vibrates so that any effect is felt in the hand holding the device as well as at the fingertip touching the touch surface or screen. Furthermore, it does not support multi-point haptics: because the entire device vibrates, each fingertip touching the screen experiences the same effect.

Recently, electrostatic actuation has been explored as a means to generate vibrations localized to the fingertip. Prior art, such as U.S. Pat. No. 7,924,144 makes use of electrostatic forces to create vibrations of the fingertip that enable one to detect a variety of textures on a touch surface. This technology has the advantage that it generates no mechanical vibrations except at the surface of the skin. While the technology also has the potential to support multi-point haptics simply by using multiple electrodes on the same surface of a screen, in practice this is difficult to do. One reason is that it is difficult to make low-resistance electrical connection to electrodes that are not near the edge of a transparent screen. Thus, of the multiple electrodes, the ones not near the edges are slow to charge. Another reason is that the haptics must co-exist with some means of sensing fingertip locations. The most common technique for multi-touch sensing is "projected capacitive" sensing, which also makes use of electrostatic charges. To minimize the interaction between the electrostatic haptics and the projected capacitance sensing, the prior art makes use of a single electrode for haptics, the size of the whole touch screen.

Multi-Point Haptics

A co-pending patent application by some of the present inventors (U.S. patent application Ser. No. 13/468,818, entitled Electrostatic Multi-touch Haptic Display) describes a number of ways of achieving multi-point electrostatic haptics. Certain aspects of that disclosure are noted herein as a background. For instance, the basis of electrostatic haptics is the modulation of frictional force as a result of directly affecting the normal force between the finger and a touch surface of a touch interface via an electric field. The electric field is established at the point of contact between the fingertip and the touch surface. This is accomplished by placing one or more electrodes near the touch surface of the substrate, insulating those electrodes from the fingertip with a dielectric layer. To set up an electric field, a circuit must be closed through the fingertip. There are two principal ways of doing this.

In the prior art, others have taught the method shown in FIG. 1a, which is a figure from U.S. Pat. No. 7,924,144, wherein capacitance of a finger-dielectric-electrode system is part of a circuit that is closed through a second contact at some other part of the body, which circuit may even be completed taking advantage of the relatively large capacitance of the human body. Thus, FIG. 1a shows an apparatus which implements a capacitive electrosensory interface, having an electrical circuit that is closed between two separate contact locations, wherein both of the two locations are fingertips.

The present inventors have devised an alternative method shown in FIG. 1b, which is similar to a figure from U.S. patent application Ser. No. 13/468,695, entitled Touch Interface Device And Method For Applying Controllable Shear Forces To A Human Appendage, wherein two separate electrodes E and E' (haptic devices) are covered by an insulating layer L and would be placed on a front or top surface of a substrate (not shown) at a single contact or touch location. The circuit is therefore closed through a single touch of a fingertip itself, not involving the rest of the body. This has the benefit of not requiring involvement of some other part of the body, but it has another benefit as well, which will be discussed herein.

To apply the two-electrode technique, it is necessary to create a suitable array of electrode pairs on the touch surface. As illustrated in FIG. 2, one approach to accomplish this arrangement for an apparatus, such as a mobile device 2, would be to simply tile a top surface or touch surface 4 with electrode pairs 6 that include electrodes 8 and 10. This top layer of electrodes has the advantages that electrodes 8, 10 can be placed precisely where they are needed on the surface 4 and that all electrodes can potentially be patterned from the same conductive layer. It will be appreciated that wires can be patterned from the same conductive material as the electrodes, or can be made of higher conductivity material.

However, this configuration has the disadvantage present in some prior art with respect to the need for respective thin conductive traces 14, 16 to connect to many of the electrodes, such as those that are not near an edge. Thin conductive traces 14, 16 with sufficiently low resistivity can be difficult to produce, especially if they need to be transparent to meet other design objectives. Another potential difficulty with this approach is that the electrode count may become quite large, especially as the touch surface becomes larger. If the x-axis requires N electrodes and the y-axis requires M, then the total electrode count with pairs, as shown in FIG. 2, is 2*M*N. Nonetheless, patterns like this one that tile the surface with electrode pairs may be used in certain situations, such as with devices having smaller screen sizes.

A second approach to creating an electrode array for the touch surface of an apparatus is shown in FIG. 3a and is referred to as a "Lattice." The diagram in FIG. 3a focuses on the electrode array, for ease of understanding. While a pattern in the form of a lattice network of lines of diamond-shaped electrodes is shown, such a pattern and shape of electrodes need not be used, but the emphasis is on covering the surface (here shown as being generally planar) with N*M electrodes that can serve in pairs. In this figure, electrodes 20 run along or parallel to a first axis (for example the x-axis), and electrodes 22 run along or parallel to a second axis (for example the y-axis). The region where a given y-axis electrode 22 crosses a given x-axis electrode 20 defines a two-electrode region (like that shown in FIG. 1b) where electrostatic forces can be applied to a user's skin, such as to a fingertip.

As shown in FIG. 3a, any electrode 20 (x-axis) and electrode 22 (y-axis) can form a pair. If different voltages are applied to, for example, the electrodes 20 and 22, then an intersection of the respective lines of electrodes 20, 22 becomes an active region or location where a finger will experience increased electrostatic force. In practice, AC voltages may be used and maximum electrostatic forces are produced when the applied voltages are 180 degrees out of phase with one another.

The magnitude of the electrostatic force can be modulated in various ways. As a few examples, one approach is to change the magnitude of the voltages applied to the electrodes. Another is to vary the duty cycle of the voltage waveforms applied to the electrodes. Yet another is to control applied voltage or current based on a measure of the electrical charge on the electrodes 20, 22. A further approach is to vary the phase relationship between the voltages on the two electrodes 20, 22. The electrostatic force is maximized when the voltages on the two electrodes 20, 22 are completely out-of-phase with one another, and minimized when they are in phase because the circuit then is no longer closed locally through the touch, contact or engagement of a user's finger, such as at a fingertip, but must be closed through the capacitance of the rest of the user's body. If $C_f$ is the capacitance from the finger to the electrodes and $C_b$ is the capacitance from the rest of the body to the device ground, then the attenuation factor (ratio of force when touching in-phase electrodes to force when touching out-of-phase electrodes) is:

$$\text{Attenuation} = \left(\frac{C_b}{C_b + C_f}\right)^2$$

Normally, $C_f$ is significantly larger than $C_b$ (at least by a factor of 5), so the attenuation factor is quite significant: more than an order of magnitude.

A pattern in the form of a Lattice network or configuration also supports multi-point haptics to a certain extent. This is illustrated in FIG. 3b, which shows a pattern having a lattice network of electrodes that further includes electrodes 24 that run along or parallel to a first axis (for example the x-axis), and electrodes 26 that run along or parallel to a second axis (for example the y-axis), and in which the intersections between lines of electrodes 20 and 22, as well as trace intersections between lines of electrodes 24 and 26, each are used to define or control the electrostatic force acting on two respective fingers, with a first fingertip F represented by a first oval and a second fingertip FF represented by a second oval. There are, however, finger locations where this multi-point capability may break down. If, for instance, two fingertips lie on the same electrode, then it is difficult to apply very different forces to the two fingers. The reason for this is that the finger-to-finger impedance through the user's body is quite small relative to the electrode-to-finger impedance ($1/(\omega C_f)$) where $\omega$ is the frequency of AC excitation. Thus, for instance, a second finger on an active x-axis electrode still has the benefit of the active y-axis electrode under the first fingertip. Note that in the example, x and y could be reversed. To ensure that the force on each finger is independent of the force on each other finger, it is necessary that they be parts of different circuits. As described above, this could be accomplished by the arrangement in FIG. 2, but with drawbacks.

Multi-Touch Sensing

Most modern multi-touch sensors are of the "projected capacitance" (pCap) variety. These sensors generally lie in a planar orientation and work on the basis of mutual capacitance between a set of transmit (Tx) electrodes that run along or parallel to a first axis (for example the y-axis) and a set of receive (Rx) electrodes that run along or parallel to a second axis (for example the x-axis), and thus are arranged orthogonally to one another. While there are many different electrode patterns in use, the most common for pCap sensors is the interlocked diamond pattern shown in FIG. 4. The Tx and Rx lines are either on different layers, or they are on the same layer, but bridges are formed where the lines would otherwise intersect, so that no contact occurs between a Tx line and any Rx line.

There is a capacitive coupling from each Tx line to each Rx line, and the amount of this mutual capacitance is reduced if a finger is placed near the intersection of the two lines of electrodes. The finger in effect "steals" some of the electric field lines that would otherwise have reached the Rx line, as represented in FIG. 5a, from Zimmerman et al., 1995. This "human shunt" is a standard mode for pCap sensing. By measuring the mutual capacitance (for which there are numerous known techniques) for each Tx-Rx pair, and interpolating the results, the centroids of the respective fingers can be located.

The same electrode pattern also can be used to measure finger locations using a self-capacitance technique, rather than mutual capacitance. Under this approach the perpendicular lines (Rx and Tx lines) are treated equivalently. Each electrode (whether in an Rx or Tx line) has a capacitance to ground, and this capacitance is increased when a finger is brought nearby. That makes it particularly easy to detect that a finger is somewhere along any given line. X and Y coordinates are found separately by querying both the x-axis Tx and y-axis Rx electrode lines. The limitation of this approach is that it does not support multi-touch sensing very well. One must consider what happens when two fingers are placed on the touch surface. In general, two x-axis Tx lines of electrodes and two y-axis Rx lines of electrodes will respond. But those lines cross at four points, for example (x1,y1) (x1,y2) (x2,y1) (x2,y2), not two points. Two locations are correct and two other locations are misidentifications or "ghosts." With such as system, there is not a simple way to disambiguate the actual fingers from the ghosts.

SUMMARY OF THE INVENTION

The purpose and advantages of the disclosed subject matter will be set forth in and apparent from the description and drawings that follow, as well as will be learned by practice of the claimed subject matter. The present disclosure generally provides systems and methods having electronic controllers for touch interfaces that provide for simultaneous sensing and actuation that facilitate multi-point haptics.

The present disclosure generally provides novel and non-obvious systems and methods for producing multi-point haptics, which the present inventors term "simultaneous sensing and actuation" (SSA). In one example, the present disclosure makes use of two layers of electrodes: a top layer (near the touch surface of an insulating substrate or sheet) for haptics (referred to herein as haptic devices), and a bottom or rear layer, which refers herein to a bottom, rear or deeper layer (attached to the bottom or rear surface of the insulating substrate or sheet and/or located at a deeper layer within the touch interface device relative to the top layer) for reliable sensing (referred to herein as sensing devices). However, the top electrodes also may be used for sensing, or optionally a deeper layer of electrodes may be used for sensing. The two electrode sets have substantially the same pattern as one another. These are referred to herein as "mirrored electrodes." In a further example, the present disclosure makes use of a single array of electrodes disposed on the front surface of a touch substrate that may serve as both surface haptics devices and sensing devices.

In a first aspect, the present disclosure presents a touch interface having simultaneous sensing and actuation comprising: an insulating substrate; one or more electrodes connected to a front surface of a substrate and being arranged in a pattern; an electronic controller configured to connect each electrode to one or more voltage levels; said electronic controller configured to produce a haptic effect by applying one or more voltages to said electrodes; and said electronic controller configured to measure the locations of one or more touch points by applying one or more voltages to said electrodes.

In a second aspect, the disclosure presents a touch interface having simultaneous sensing and actuation comprising: an insulating substrate; one or more electrodes connected to a front surface of a substrate and being arranged in a pattern; an electronic controller configured to connect each electrode to a positive voltage or a negative voltage; said electronic controller configured to produce a haptic effect by applying positive and/or negative voltages to said electrodes; and said electronic controller configured to measure the locations of one or more touch points by applying positive and/or negative voltages to said electrodes.

In a third aspect, the disclosure presents a method of using a single set of electrodes on a substrate of a touch interface to simultaneously produce haptic effects on the substrate and measure finger locations relative to the substrate, wherein haptic effects are produced by selecting a first subset of electrodes that are applied to the substrate, using a voltage supply to raise the first subset of electrodes to a positive or negative voltage, then disconnecting the first subset of electrodes from the voltage supply, then selecting a second subset of electrodes and using a voltage supply to raise the second set of electrodes to a positive or negative voltage while monitoring current or a charge required to raise the second set of electrodes to the positive or negative voltage.

It will be appreciated that touch interfaces disclosed herein provide strong capacitive coupling between each surface haptic device connected to the front surface of the substrate and each respective sensing device aligned therewith and connected to the rear surface of the substrate. Also, this strong capacitive coupling enables changes in capacitance associated with the surface haptic devices (due, for instance, to touch by a finger) to be detected from the sensing devices.

It further will be appreciated that for touch interfaces disclosed herein the one or more electrodes that provide electrostatic actuation for haptic effects also may provide capacitance-based sensing of finger location on the front surface of the substrate.

It is to be understood that both the foregoing general description and the following detailed description are exemplary and provided for purposes of explanation only, and are not restrictive of the subject matter claimed. Further features and objects of the present disclosure will become more fully apparent from the following detailed description, taken with the following drawings, and from the appended claims.

BRIEF DESCRIPTION OF THE DRAWINGS

In describing the example embodiments, reference is made to the accompanying drawing figures wherein like parts have like reference numerals, and wherein.

It should be understood that the drawings are not to scale. While some mechanical details of a touch interface device, including details of fastening means and other plan and section views of the particular arrangements, have not been included, such details are considered well within the comprehension of those of skill in the art in light of the present disclosure. It also should be understood that the present invention is not limited to the example embodiments illustrated and that the examples are shown in simplified form, so as to focus on the principles systems and methods and to avoid including structures that are not necessary to the disclosure and that would over complicate the drawings.

DETAILED DESCRIPTION OF THE INVENTION

The present disclosure provides several examples relating to touch interface devices that are intended to provide multi-point haptics by use of simultaneous sensing and actuation (SSA) in a surface haptic device (SHD), and electronic controllers therefor. The touch interface devices include a substrate to which electrodes are connected, and a controller operably connected with the electrodes for generating haptic effects and sensing finger location. A controller may utilize any of the approaches disclosed herein and be configured to operate with any of the patterns of electrodes. In one example, the multi-point haptics having simultaneous sensing and actuation may be facilitated by using mirrored electrodes. However, it has been discovered that the methods of SSA and ghost disambiguation taught herein benefit from but do not require use of mirrored electrodes. Indeed, it will be appreciated that a system and methods for providing a touch interface of the present disclosure generally may be embodied within numerous configurations and for use with various devices. One further example of which includes use of a single array of electrodes disposed on the front or top surface of the touch substrate, which may serve as both surface haptics devices and sensing devices. The purposes and advantages of the disclosed subject matter will be set forth in and apparent from the description and drawings that follow, as well as will be learned by practice of the claimed subject matter.

As noted previously, to ensure that the force on each finger is independent of the force on each other finger, it is necessary that they be parts of different circuits. The present disclosure teaches a further advantageous method of a guaranteeing independence for at least two fingers by use of at least tri-intersection of electrodes on the top surface. In addition, the disclosure teaches a system having a failure mode that uses mirrored electrodes by which, if a haptic device is scratched, the haptics may stop functioning, but the capacitive sensing continues to operate.

Figure 5A:
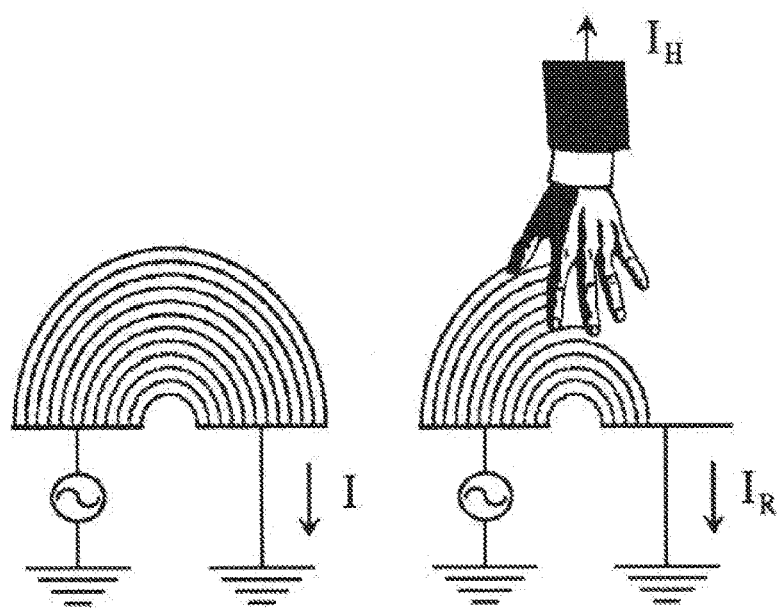
FIG. 5a is a diagram that represents "the human shunt" as a standard mode for pCap sensing.
Figure 5B:
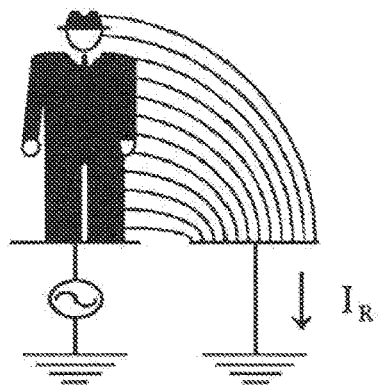
FIG. 5b is a diagram that represents "the human transmitter" as a secondary effect for pCap sensing, but may be a dominant effect when the electrodes are on the front surface of a substrate.

With respect to systems using mutual capacitance, it is important to understand that the finger actually produces two effects when brought near an intersection of Tx-Rx lines of electrodes. These are illustrated in Zimmerman et al., 1995, which referred to the effect in FIG. 5a as "the human shunt" and the effect in FIG. 5b as "the human transmitter." The first effect is the normal pCap model because the second effect is quite small when the electrodes are separated from the fingertip by more than about 0.1 mm of glass. Electrostatic haptics, however, places electrodes on the front or top (touch) surface of the glass substrate. In preferred embodiments, those electrodes are separated from the finger by only a thin layer of dielectric, typically on the order of microns. The use of such a thin protective layer allows suitably large electric field strengths to be developed at reasonably low voltages (e.g., less than 100 volts). This situation greatly increases the importance of transmission relative to shunting, such that it becomes the dominant effect when the electrodes are on the front surface of the glass substrate. The fingertip in effect becomes a switch that (almost) directly connects the Tx line electrodes to the Rx line electrodes.

There are several implications of this reversal of effect magnitudes when insulators are thin. On the one hand, the transmitter effect is quite large, which bodes well for achieving a high signal-to-noise ratio (SNR), presuming that the front or top surface electrodes are used for sensing. On the other hand, the transmitter effect does not lend itself to multi-touch sensing because transmission occurs not just through one fingertip, but from one fingertip to the next due to the low finger-to-finger impedance through the body. A more fundamental issue, however, is whether one chooses to use the front-surface electrodes for sensing at all.

The potential difficulty with front or top surface electrodes is that they are not as well protected as rear or bottom surface or deeper layer electrodes. In a typical pCap sensor, the electrodes (sensing devices) are placed behind a substrate such as a sheet of glass or clear plastic (i.e., they are "rear-surface", or on an even deeper layer). The glass or plastic serves as a so-called "cover lens" and is a protective element that keeps the electrodes from being damaged by abrasion or scratches. As mentioned above, however, the electrodes responsible for haptics (haptic devices) need to be on the front surface in order to produce a large tactile effect using a modest voltage. To protect these electrodes, it is advisable to use a very durable dielectric covering or layer.

The inventors have discovered that it is possible to use a single layer of electrodes as both haptics devices and sensing devices. Thus, patterns of electrodes such as those shown in FIGS. 2, 3a, 3b, 4 and 8a-12 could be employed and used both as haptics devices and as sensing devices. The protective materials may provide adequate protection for many touch interfaces, however, they cannot absolutely guarantee that no scratches will occur to the top surface electrodes. Some common materials such as quartz and hardened steel may be hard enough to cause scratches when in contact with such protective materials. If a scratch occurs, one failure mode that may prove acceptable is for haptics to stop functioning, but for capacitive sensing to keep on operating. Such systems, however, do present compromises that leave a further need in the art for an improved way of providing multi-point haptics.

For improved protection of sensing devices, it may be desirable to use the pCap practice of placing sensor electrodes underneath the cover glass. However, this presents a challenge to achieve high-quality multi-touch sensing on a protected layer, in spite of possible screening by electrodes used for haptics on a surface layer. This is achieved by the use of "mirrored electrodes." In this context, the term "mirrored" does not refer to a reflective surface finish. Rather, mirrored electrodes is the use of two layers of electrodes: a top layer (near the touch surface of an insulating substrate or sheet) for haptics (referred to herein as haptic devices), and a bottom layer (attached to the bottom surface of the insulating substrate or sheet) for sensing (referred to herein as sensing devices). The two sets of electrodes have substantially the same pattern as one another, and thus in a general sense can be said to present a mirror image of each other. Thus, touch interfaces using mirrored electrodes have both top and bottom layers of electrodes that are in substantially similar patterns, where the patterns may include for example, those shown in FIGS. 2, 3a, 3b, 4 and 8a-12.

Simultaneous Sensing and Actuation

Figure 6:
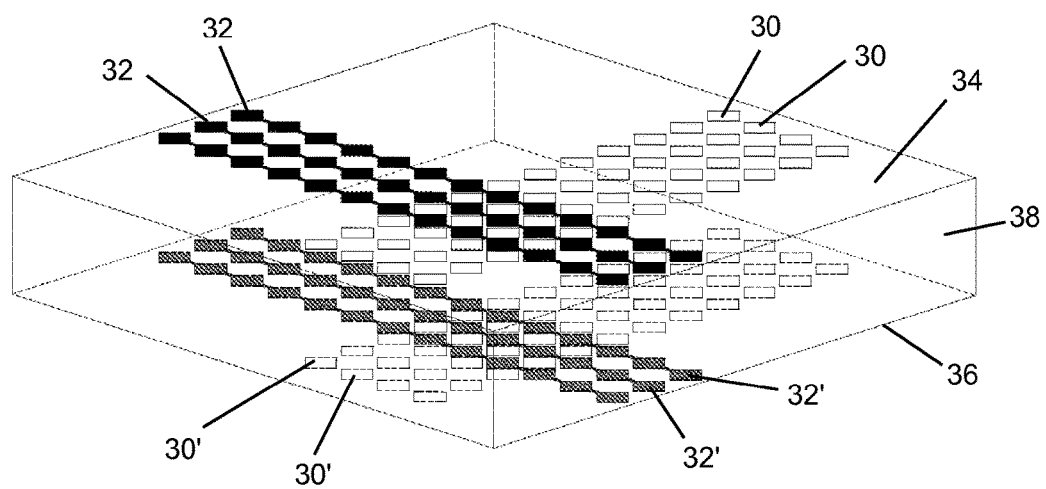
FIG. 6 is a simplified diagram of a touch interface that represents use of "mirrored electrodes" with a front or top (haptic) layer of electrodes in a pattern and a rear or bottom (sensing) layer of electrodes being in a substantially similar pattern and, for ease of viewing, the vertical separation between the layers is greatly exaggerated, only a few lines of electrodes are shown and in a very simplistic form.

Thus, as illustrated in FIG. 6, one aspect of the present disclosure is the use of mirrored electrodes, which include substantially identical, aligned, electrode patterns with electrodes 30, 32 (haptic devices) on the front or top (touch) surface 34 and electrodes 30', 32' (sensing devices) on the rear or bottom surface 36 of an insulating substrate 38 or sheet.

The concept of mirroring can be extended to any electrode pattern, including for instance, as previously noted, the patterns in FIGS. 2, 3a, 3b, 4 and 8a-12. The patterns also may be applied to any portion of a surface, from discrete or isolated locations to the entire surface. For instance, with the pattern shown in FIG. 6, the mirrored arrangement provides a strong capacitive coupling between each front or top (touch) surface electrode 30, 32 and its mirrored or similarly arranged rear or bottom surface electrode 30', 32'. In general, mirroring should work any time that the glass or other substrate thickness is significantly less than the typical electrode width, and even if the substrate is not planar. For instance, the electrodes may be 5 mm wide when using a glass substrate 1 mm thick.

As a result of mirroring, a signal sent to a bottom electrode (sensing device) will induce a signal on the top surface electrode (haptic device) above it, even if the top surface electrode has been transected by one or more scratches. Thus, this method does not depend significantly on the resistance of the top surface (haptic) electrodes, and therefore, the bottom surface (sensing) electrodes continue to work even if the top surface electrodes are compromised by scratches. If top and bottom surface electrodes overlay each other in a one-to-one relationship (either partially or completely), then there should be minimal mixing of signals between adjacent electrodes. In particular, the top surface electrodes can be used for haptic actuation, without those top surface electrodes spanning across two or more lower surface sensing electrodes and thus mixing or blurring the desired sensing performance of the lower electrodes. Indeed, the mirrored arrangement offers several interesting possibilities.

Figure 7A:
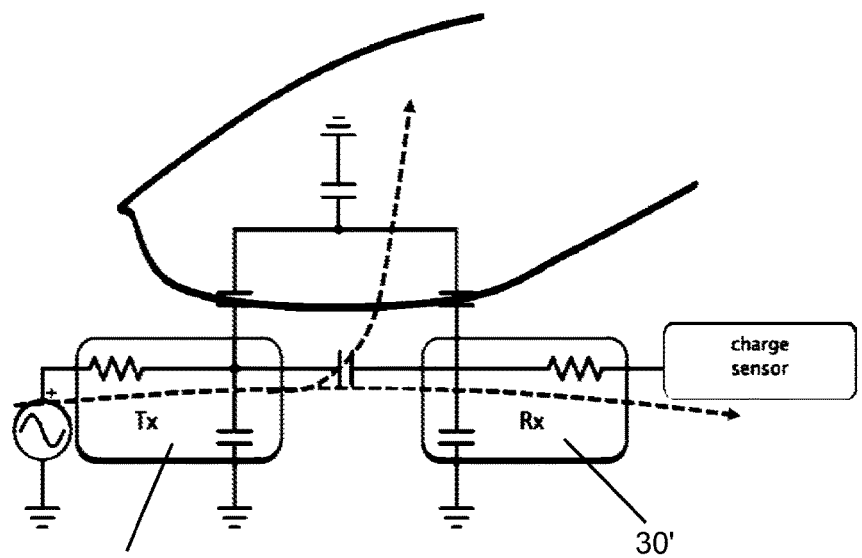
FIG. 7a is a diagram of a standard or typical pCap electrical arrangement where rounded rectangles represent bottom surface (sensing) electrodes.
Figure 7B:
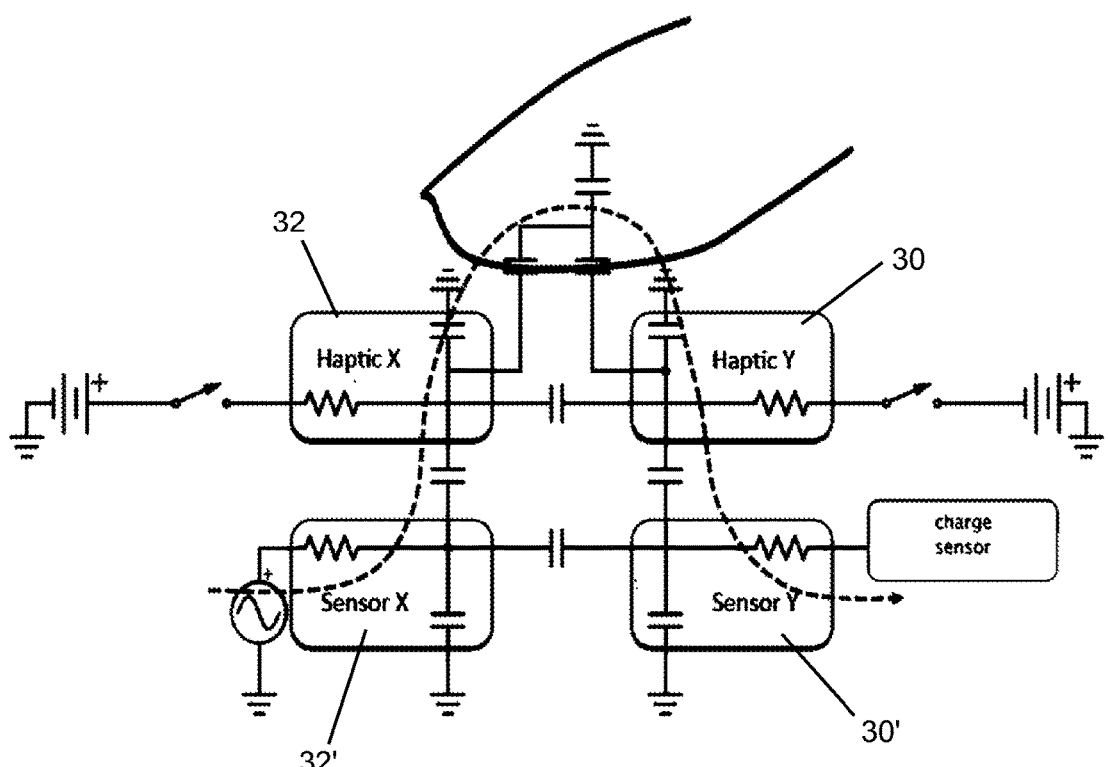
FIG. 7b is a diagram of a mirrored electrodes electrical arrangement where the finger acts as a transmitter.

One possibility is to use some of the bottom lines of electrodes 32' as (transmit) Tx electrodes and others, such as electrodes 30' as (receive) Rx electrodes, as is normally done in pCap sensing. A finger placed above a particular location of a Tx-Rx junction should produce a large signal regardless of the presence of scratches on the top surface. This is illustrated in FIG. 7b where the finger acts as a transmitter, which can be compared to a typical or standard pCap configuration shown in FIG. 7a where the finger acts as a shunt. For a wide range of parameter values, this arrangement produces a strong effect with better signal-to-noise ratio (SNR) than typical pCap. This improved SNR offers several potential benefits, such as faster sensing (especially useful for haptics), higher resolution, or lower power consumption.

Unfortunately, the strong effect just described is due to the transmitting phenomenon, not to the shunting one. Because transmitting can also occur via a signal from one finger to another, modeling thus far suggests that ghosting, or misidentification of finger touches, may occur. Suppose that two fingers are placed on the surface at (x1,y1) and (x2,y2). A signal sent along x1 will produce a result at both y1 and y2. Thus, (x1,y2) represents a ghost finger location. Accordingly, further approaches may be utilized to achieve high-resolution multi-touch haptics without ghosting.

Multi-Touch Sensing with Mirrored Electrodes

From the above discussion, mirrored front or top (haptics) and rear or bottom (sensing) electrodes serve to "project" the bottom activation pattern to the top. Moreover, strong capacitive coupling from the top electrodes to the finger should allow significantly higher SNR than with conventional pCap sensing. Unfortunately, ghosts or misidentifications of finger touches can appear because of the enhanced "human transmitter" effect (in contrast to the "human shunt" effect that dominates for back-surface electrodes), in combination with the significant signal conductivity from finger to finger. This same difficulty will occur if the top electrodes are used directly for sensing as well as haptics. The present disclosure, however, provides newly developed approaches to multi-touch haptics, overcoming this disadvantage. Four such methods, each with its own strengths, are disclosed herein.

Method 1: Tissue Resistivity

Because of the resistance from one finger to the next, the ghosts or misidentifications are in fact of lesser intensity than the actual fingers. The magnitude of the intensity difference is characterized by an RC time constant determined by the capacitance from the top surface electrode to the fingertip (~1 nF) and the body's internal resistance from one fingertip to the next (estimated at 100 to 1000 ohms). This time constant is longer than the time constant for querying an electrode, which is governed by the resistance of the electrode (assuming Indium-Tin Oxide (ITO), about 1-10 k $\Omega$) and the capacitance of that electrode to ground (about 100 pF). If the time constant for finger-to-finger transmission is significantly longer than that for querying an electrode, it is possible to distinguish individual finger touches by using an excitation signal that would be too fast to transmit efficiently through the fingers. Doing so will, in effect, isolate one finger from the other finger(s). The timing constraints are challenging given the resistance of ITO electrodes, but the approach becomes more promising if ITO is replaced by another material having lower resistance. Several such materials, including silver nanowires and graphene, are known in the art. Another approach is to use thicker layers of ITO, which have lower resistivity. Helpfully, it is not necessary that the time constant for finger-to-finger transmission actually be longer than that for querying an electrode. It may be adequate that the time constant diminish the ghost signals sufficiently to distinguish them from the actual finger touch signals.

Method 2: Mutual Capacitance

Although the human transmitter effect is stronger than the human shunt effect for the electrodes directly beneath the finger, this is not necessarily true for other nearby electrodes. For other pairs of top surface electrodes that are near to the finger, but not directly beneath it, the mutual capacitance will be diminished. Thus, there will be a pattern of reduced mutual capacitance near to an actual finger touch, but not near to a ghost. Candidate finger touches can therefore be identified using self-capacitance, and disambiguated from ghosts by using mutual capacitance of nearby electrode intersections.

Method 3: Computational

By collecting the whole matrix of mutual signal intensities, the linear system can be inverted to produce a solution for the location of all the fingers and the cross-coupling efficiencies that interconnect them through the users hand and body, in order to match the observed intensities. This holistic solution has much superior noise immunity and is scalable to large numbers of fingers. Another benefit of this method is the determination of not only the finger locations but also their cross-coupling efficiencies. For instance, fingers of the same hand cross-couple more strongly than fingers belonging to opposite hands. Being able to distinguish fingers by hand suggests fascinating user interface possibilities. Additionally, and also promising novel applications, the fingers of a second user simultaneously touching the same screen, are plainly distinguishable by their much weaker cross-coupling to the first user's fingers.

Method 4: Tri-Intersection

Figure 8A:
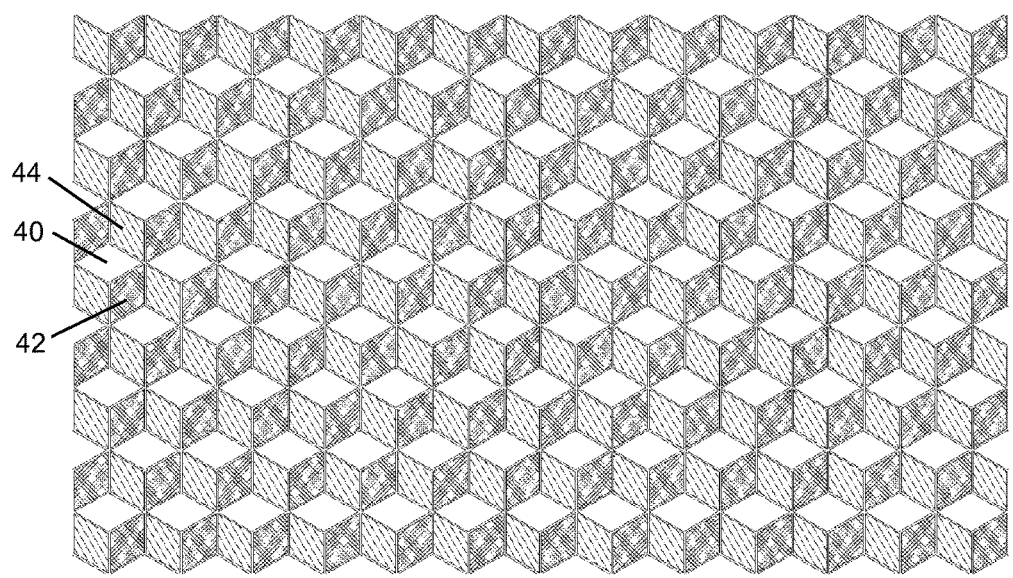
FIG. 8a is a diagram of electrodes having three-fold symmetry.
Figure 8B:
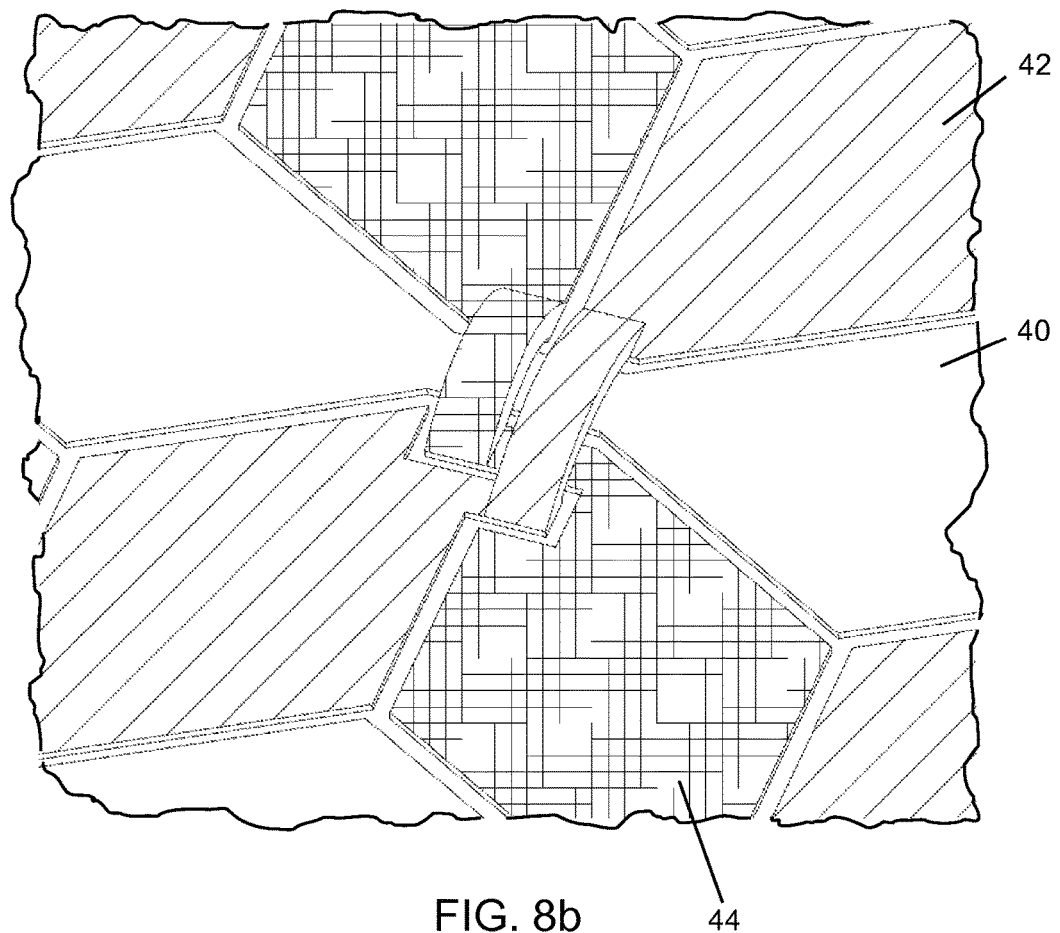
FIG. 8b is a diagram showing a bridging technique for electrodes of FIG. 8a having three-fold symmetry and that requires the same processing steps as needed for interlocked diamond electrode patterns.

A third set of mirrored electrodes, as shown in FIGS. 8a and 8b, offers another route to disambiguation. The method associates a finger touch of a touch screen with locations where three electrodes 40, 42, 44, not just two, intersect or are positioned immediately opposed to each other. This will be referred to herein as a tri-intersection and it would include bridging for the respective lines of electrodes to avoid actual intersection of the electrodes themselves. As will be explained, ghosts may still occur, but will not persist when the fingers are actually moving.

When introducing a third set of electrodes, many geometries are possible. FIG. 8a shows a preferred embodiment with three-fold symmetry. Another geometry would be one based on the standard interlocked diamonds (FIG. 4), but with a diagonal set of electrodes as well. With any three-electrode geometry, a consideration would be how to handle bridges. FIG. 8b shows that it is possible to provide the necessary bridges without any additional processing steps.

Figure 9A:
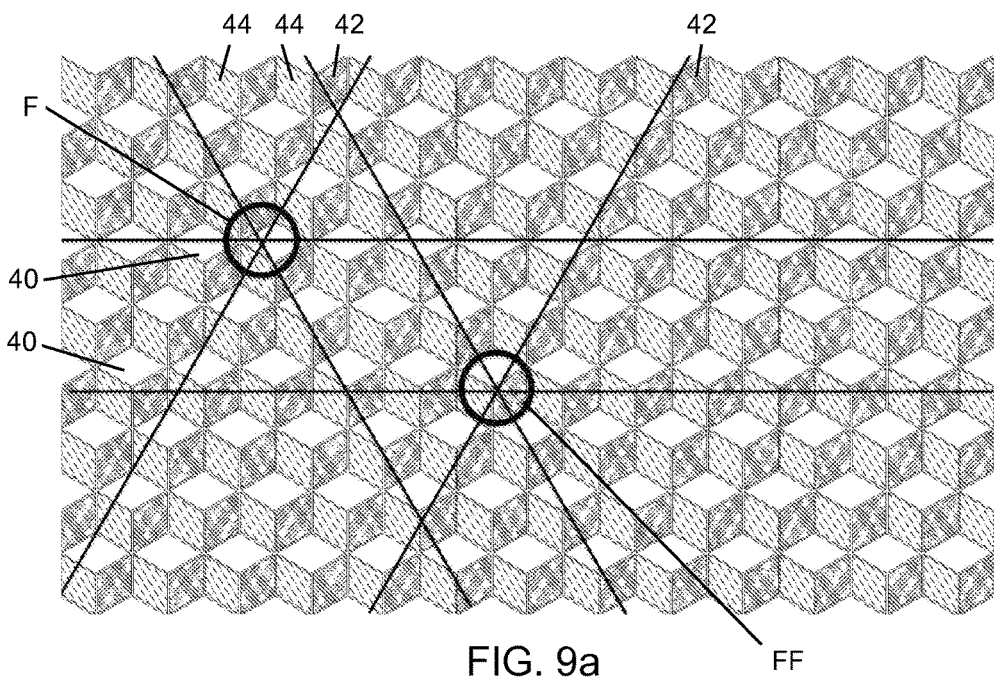
FIG. 9a is a diagram wherein circles represent finger touches and showing that, with two fingers and three-fold symmetry, a misidentification or "ghost" cannot occur because such as ghost would require three "live" electrodes all of which must cross at one location.
Figure 9B:
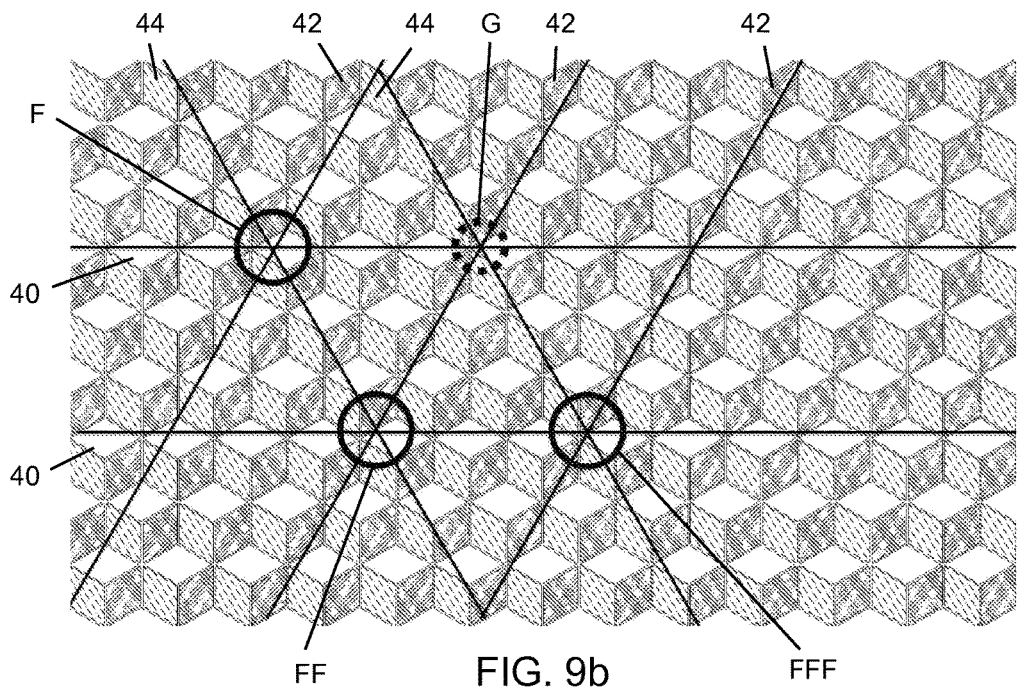
FIG. 9b is a diagram similar to that of FIG. 9a but showing that, with three fingers and three-fold symmetry, a ghost can occur only in certain configurations.
Figure 9C:
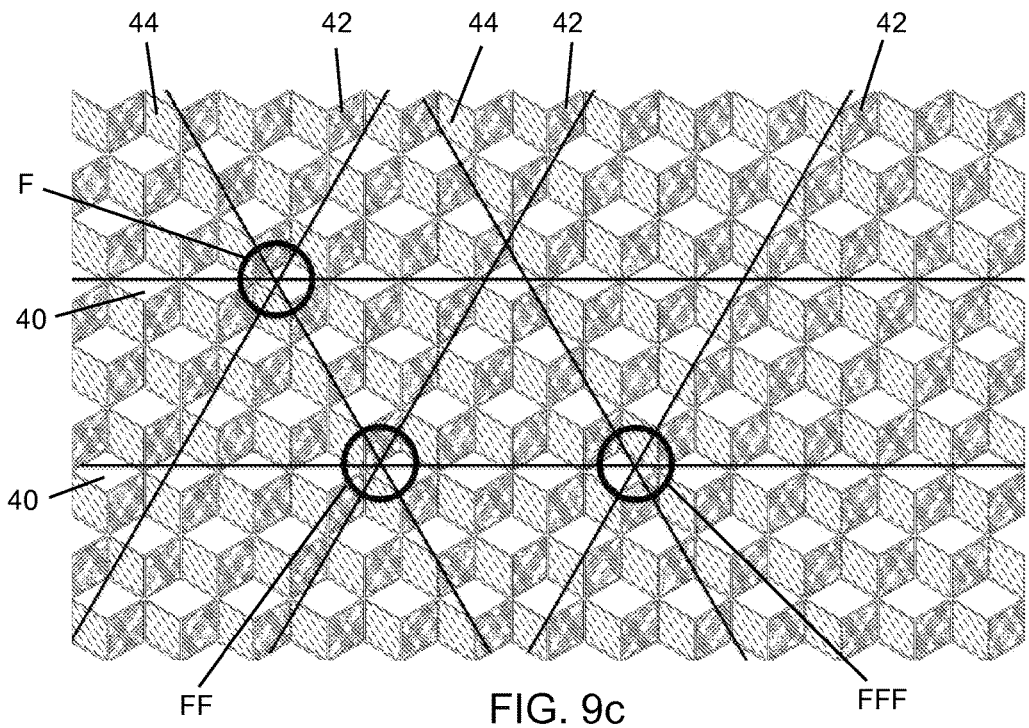
FIG. 9c is a diagram similar to that of FIG. 9b but showing that, if one of the three fingers moves just a small amount, with three-fold symmetry, the ghost disappears.

The advantages of three axes are further illustrated in FIGS. 9a-9c. If a finger touch is present (represented by a first circle F), then three electrodes 40, 42, 44, all of which cross at the location of the finger touch, should report a change in self-capacitance. As illustrated in FIG. 9a, if two finger touches are present (represented by a first circle F and second circle FF), no misidentification or ghosting is possible.

As illustrated in FIG. 9b, if three finger touches are present (represented by a first circle F, a second circle FF and a third circle FFF), misidentification or ghosting is possible, as represented by the dashed circle G, but only for certain finger touch configurations (FIG. 9b). One should consider, however, that when touching the surface of the touch interface, fingers are normally in motion or moving across the surface. Thus, misidentifications or ghosts G would tend to appear and disappear, as with FIG. 9c where a small amount of movement of one of the fingers (FFF) results in a disappearing ghost. Fortunately, a software solution for identifying and discarding ghost finger touches should be able to address this situation, with at least two approaches described herein.

The first approach is based on mutual capacitance. In the first approach, one axis of electrodes (e.g., the x-axis in FIGS. 8a-8b and 9a-9c) would be treated as transmit Tx electrodes (haptic devices). Along each Tx line are a series of "candidate" locations, defined by the intersection of pairs of electrodes, one from each other axis. (There are actually some of these on one side of the Tx line and some on the other, but that is a level of detail we will ignore for purposes of exposition.) Thus, given a Tx line of electrodes, there are two Rx lines associated with each location. These signals can be summed to produce a signal strength for each location, and a full map can then be produced by interpolation. Finger touch misidentifications or ghosts would be of reduced magnitude for two reasons: finger resistance and imperfect alignment (most of the time). A simple temporal filter—adding up the intensities for several samples—would further reduce ghost magnitude whenever fingers are moving across the surface of the interface device.

Figure 10A:
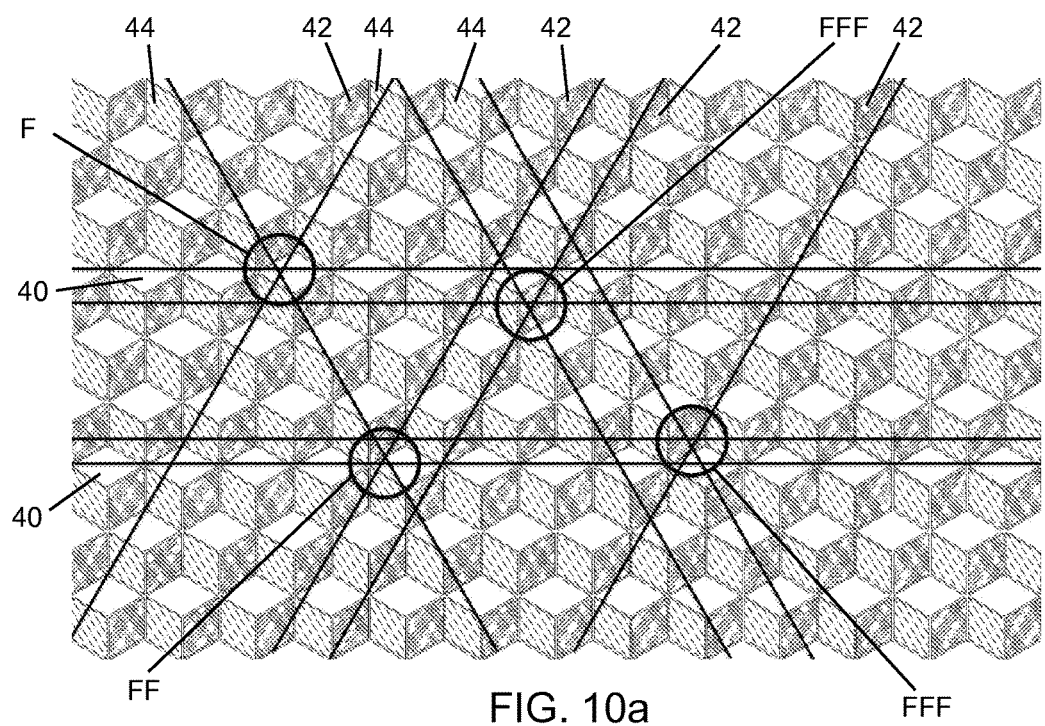
FIG. 10a is a diagram wherein circles represent finger touches and lines represent data from self-capacitance that are used in sensing finger position.
Figure 10B:
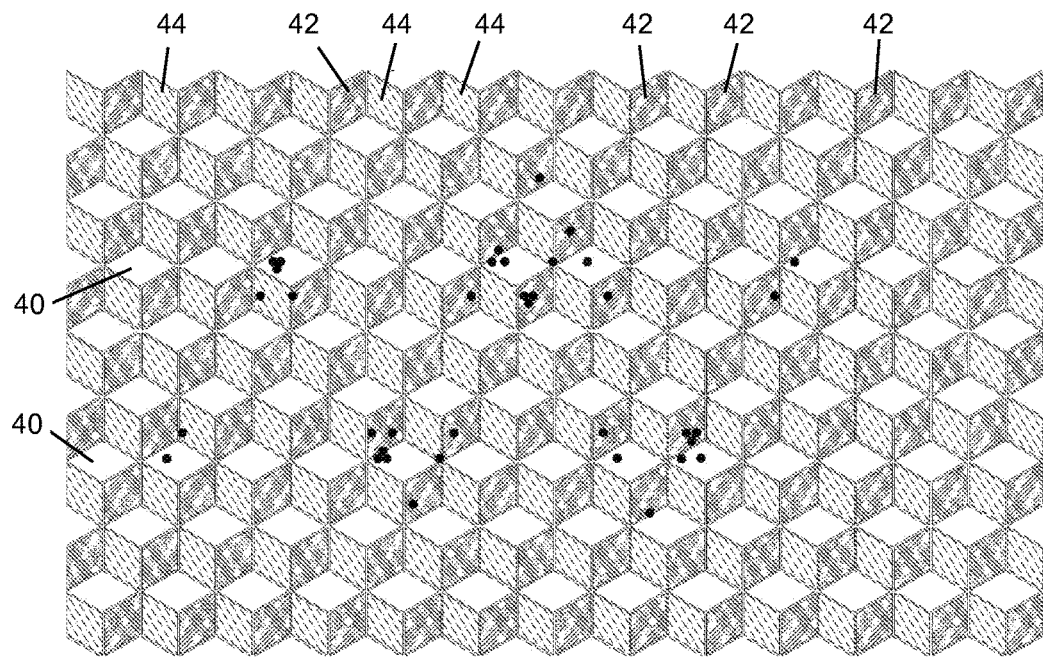
FIG. 10b is a diagram wherein the line intersections in FIG. 10a have been computed and indicated by points.
Figure 10C:
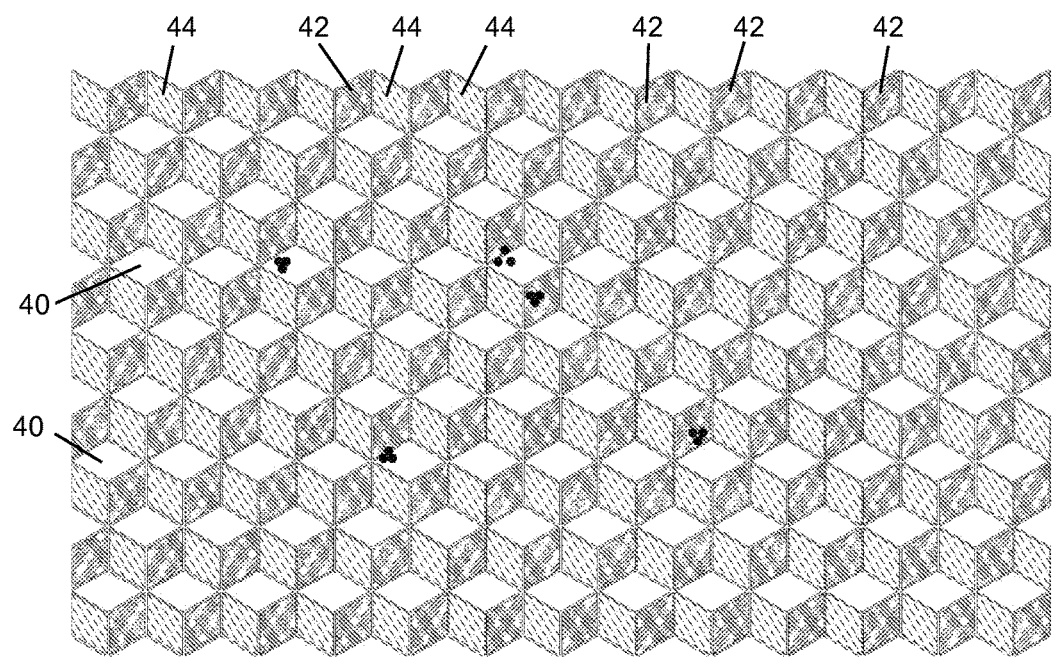
FIG. 10c is a diagram wherein a cluster analysis has been used with the computed intersections from FIG. 10b, so as to discard unlikely finger touches, and wherein a ghost remains but is of reduced magnitude.

The second approach is based on self-capacitance. Self-capacitance measurements of all the electrodes would indicate which of them were reporting finger touches (represented by a first circle F, a second circle FF, a third circle FFF, and a fourth circle FFFF), producing data similar to the solid lines shown in FIG. 10a. These lines would be found using interpolation to ensure the greatest accuracy for the self-capacitance measurements, and to disambiguate lines associated with different fingers. The locations of intersections of these lines would then be computed, as shown by the dots in FIG. 10b, and cluster analysis (e.g., via bounding boxes) would be used to determine likely finger touches, as shown in FIG. 10c where a ghost remains but is of reduced magnitude. Actual finger touches would be separated from ghosts based on the tightness of the tri-intersection cluster. As in the previous approach, temporal filtering would further help to identify and discard misidentifications or ghosts.

Figure 15:
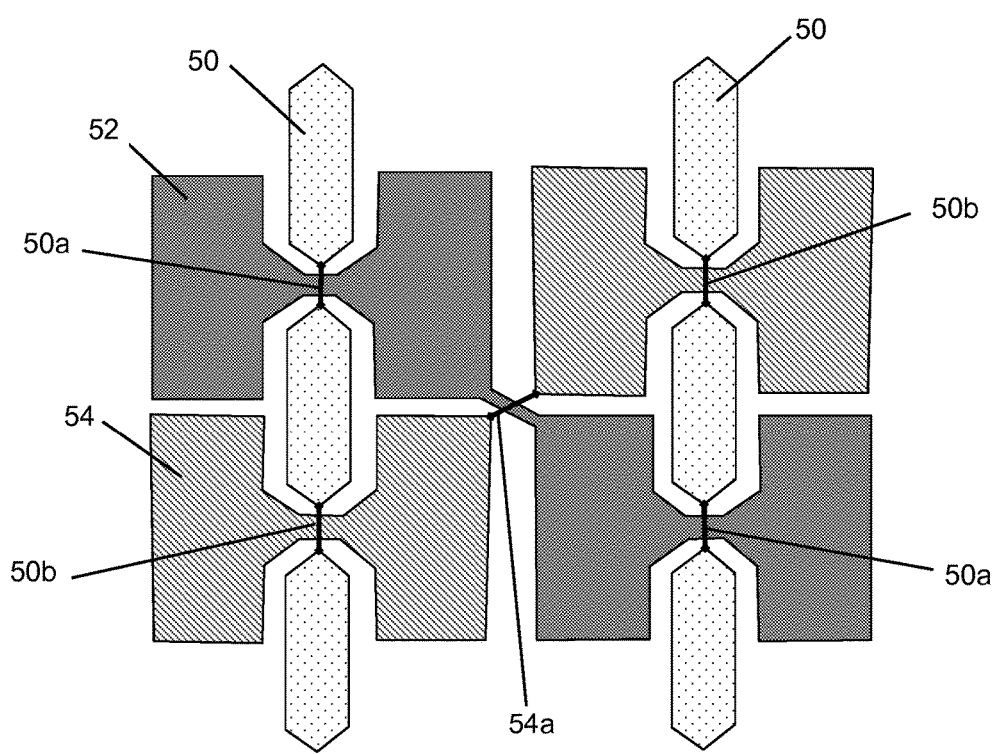
FIG. 15 is a diagram showing electrodes in a non-symmetrical tri-intersection pattern.

In another embodiment, it will be appreciated that the tri-intersection electrodes do not need to be symmetric or have special cross-over structures, and can be implemented with current processes in patterns similar to the one shown in FIG. 15. For example, FIG. 15 shows three lines of electrodes 50, 52 and 54. Electrodes 50 have bridges 50a crossing the electrodes 52 and bridges 50b crossing the electrodes 54, while electrodes 54 have bridges 54a crossing electrodes 52. The bridges could be in alternative patterns, while still achieving tri-intersection. Also, while FIG. 15 shows one tri-intersection, it will be understood that the pattern shown, or alternative patterns, could be replicated to generate multiple tri-intersections over a surface.

It also should be noted that tri-intersection can be combined with any of the other three methods to further improve disambiguation. Also, it will be appreciated that using additional sets of intersecting axes can be extended even further to quad-intersection, penta-intersection, and so forth.

Multi-Point Haptics with Mirrored Electrodes

Figure 1A:
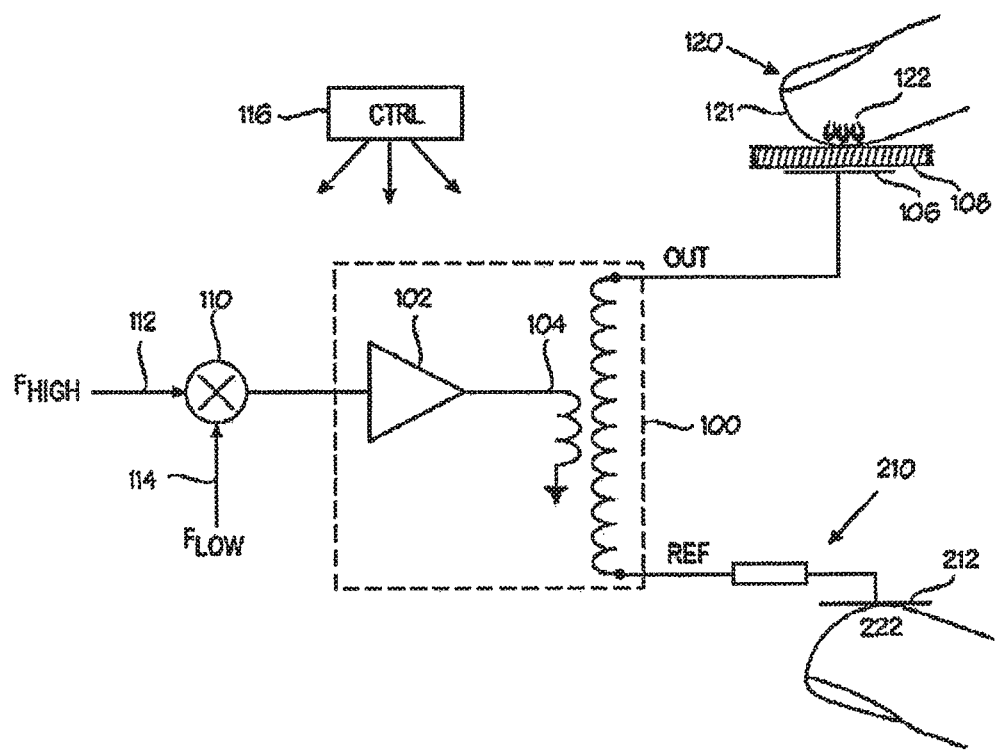
FIG. 1a is a figure from a prior art patent of an apparatus which implements a capacitive electrosensory interface, having an electrical circuit that is closed between two separate contact locations that are contacted by two different fingers.
Figure 1B:
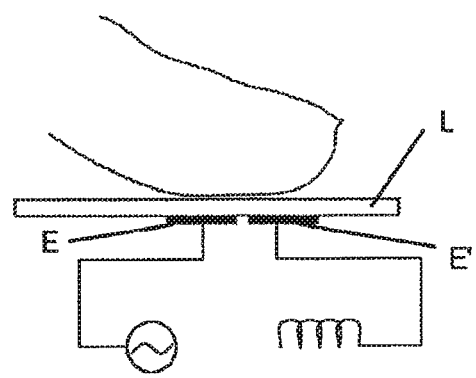
FIG. 1b is a portion of a figure from a co-pending application by the present inventors which shows closing of an electrical circuit through two different electrodes at the same contact location by a single finger.
Figure 2:
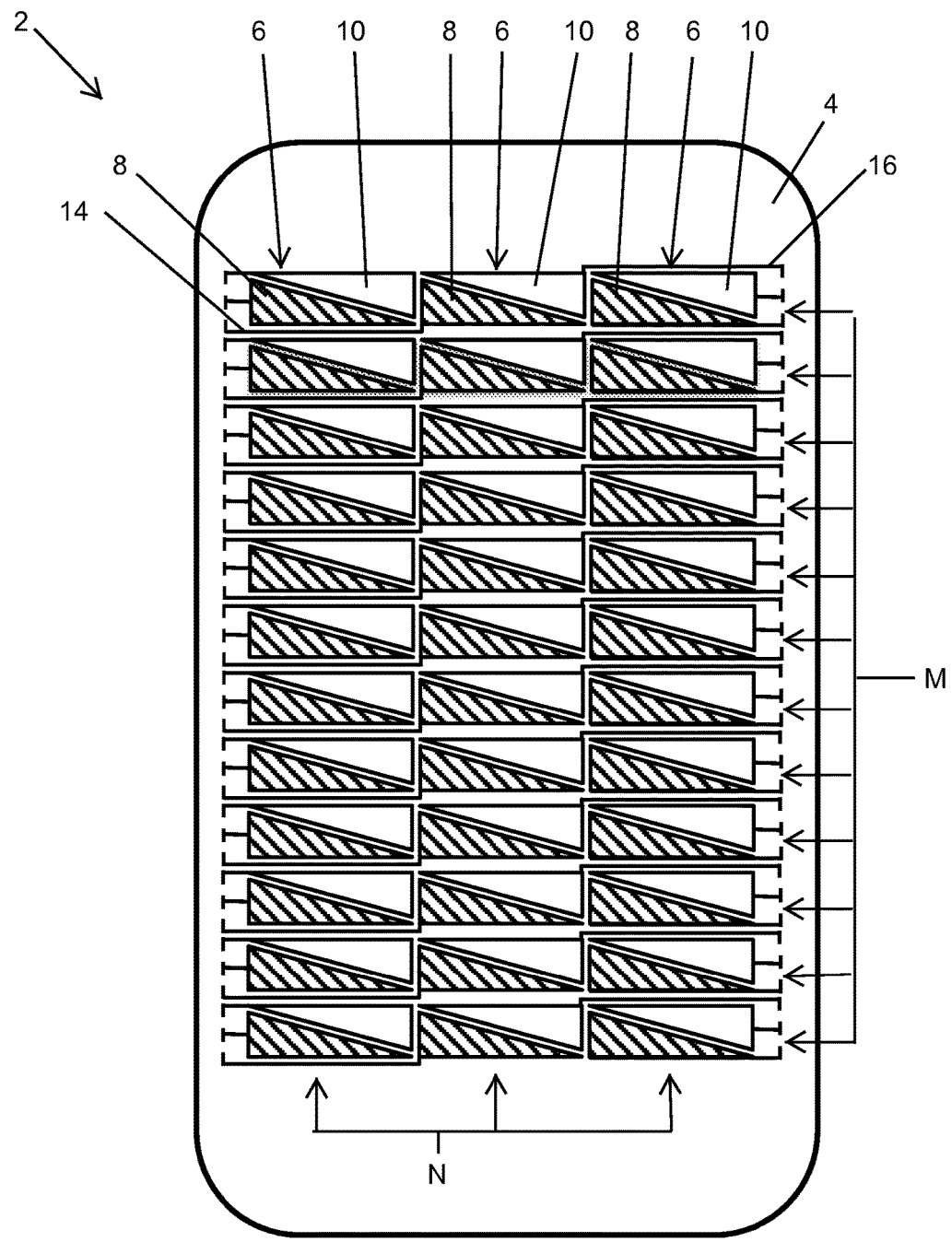
FIG. 2 is a diagram of an arrangement of electrodes for an apparatus, such as a mobile device.
Figure 3A:
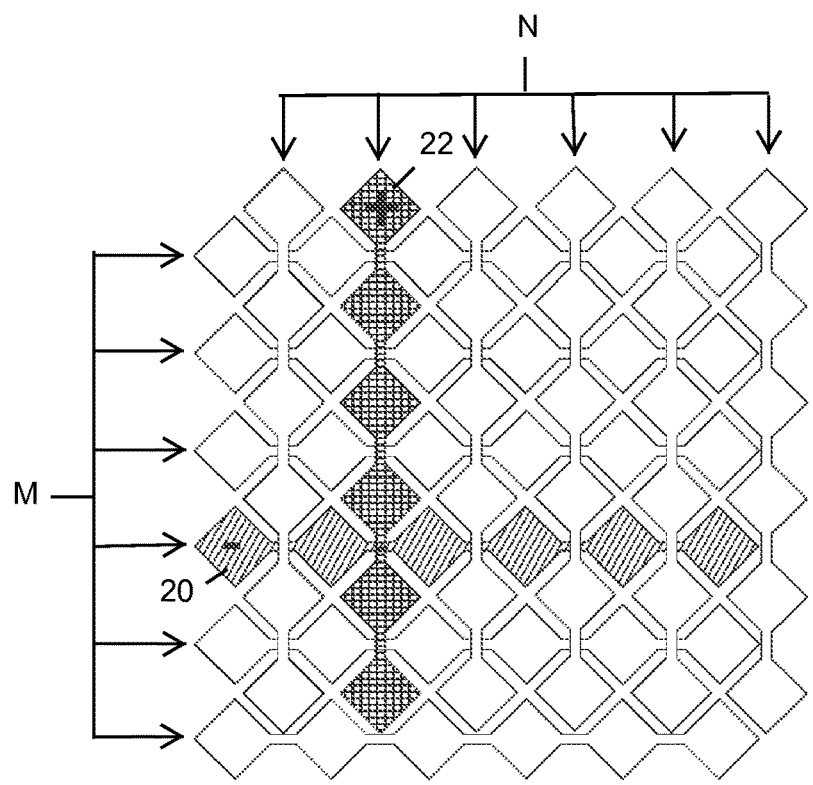
FIG. 3a is a diagram of a first example pattern of electrodes being in a lattice network.
Figure 3B:
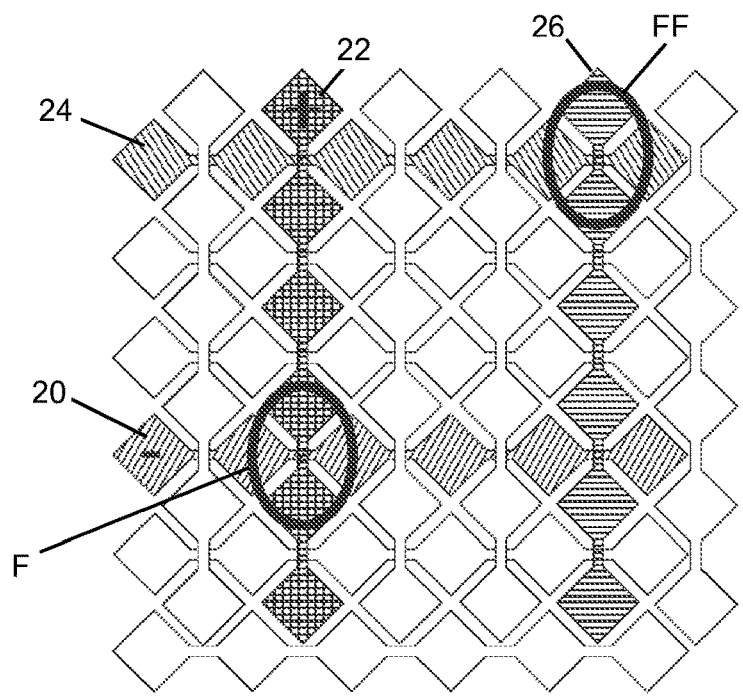
FIG. 3b is a further diagram of an example pattern of electrodes in a lattice network and showing multi-point haptics.
Figure 4:
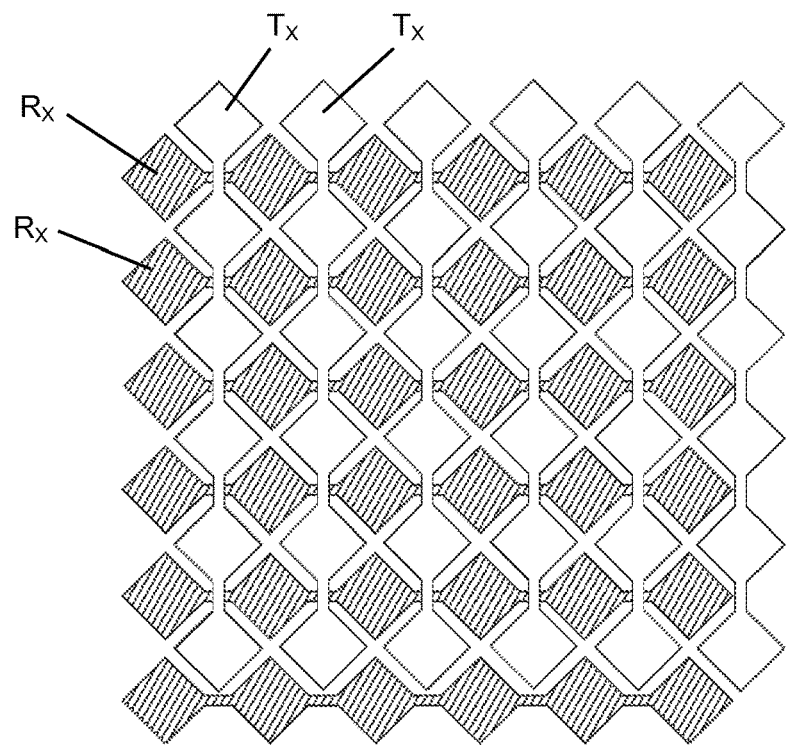
FIG. 4 is a diagram showing a diamond pattern of electrodes that may be used in pCap sensors.

Multi-point haptics requires that each finger touch location lie above a pair of electrodes. Moreover, the pair of electrodes for each finger touch should be electrically isolated from those for the other fingers to ensure that haptic effects can be independently assigned. FIG. 3b shows an example of this for two fingers, but as discussed, electrical isolation is not possible when two fingers are on the same active electrode.

Figure 11:
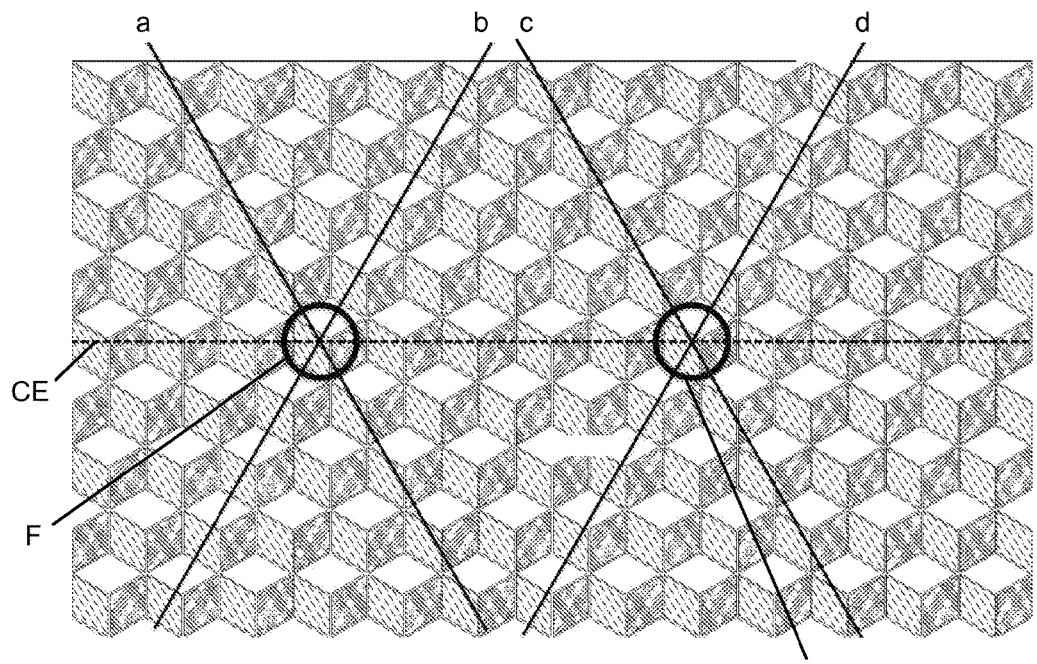
FIG. 11 is a diagram wherein circles represent two finger touches lying on the same electrode (in this illustration, the x-axis common electrode is referenced by a dashed line), where the finger touches can be addressed independently by keeping that electrode electrically isolated via a high impedance connection to ground, and forces can be applied to each finger using the other two electrodes that pass beneath it.

The tri-intersection pattern of electrodes (used above for disambiguating sensing) also provides one solution to this difficulty in haptics. With tri-intersection, there are three sets of electrodes under each finger touch, and any two of the three can be chosen as the active pair for producing an electrostatic field. As shown in FIG. 11, the finger touches (represented by a first circle F and a second circle FF) remain independently addressable even if they lie above a common electrode. In FIG. 11, the common electrode is shown by the dashed line CE, and the key is to ensure that the common electrode is not driven but rather is left at high impedance, isolated from sources or ground. This still leaves two electrodes under each finger, and these can be independently addressed.

While the active electrodes can be addressed all at once, it is best to address them sequentially as follows: electrodes c and d are isolated while a and b are connected to voltage sources of opposite polarity. Charges build up underneath the fingertip touch with a time constant governed by $C_f$ and the resistance of the electrodes. Using values discussed earlier, this time constant may be 1-10 μsec. After charges have built up under one finger touch, they can be expected to stay there for some period of time, leaking away slowly through the resistivity of the skin. Various experimental estimates suggest that the leakage time constant is greater than 100 μsec, although the exact number depends on the condition of the skin. Thus, after electrodes a and b are charged, they can be isolated while c and d are charged. Using this technique, it should be possible to cycle through approximately 10 finger touch locations, applying charge to each, without undue leakage.

Figure 12:
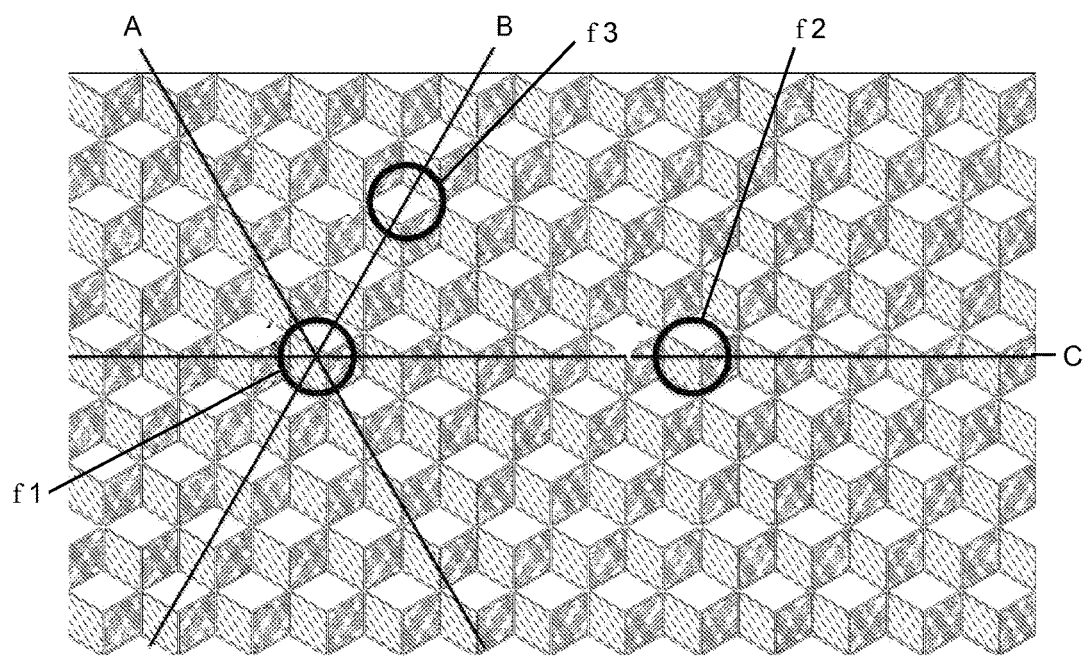
FIG. 12 is a diagram somewhat like that in FIG. 11, but showing a finger touch arrangement in which tri-intersection is inadequate to assign all forces on the three finger touches.

As with sensing, there are configurations in which independent control of haptic effects may not be feasible. FIG. 12 illustrates such a situation. Here, in addition to a first finger touch (represented by a first circle f1) there are two additional finger touches (represented by a second circle f2 and a third circle f3) which share electrodes with the finger touch f1. If an electrode A is paired with an electrode B in order to produce an electrostatic force on the finger touch f1, then force will be applied to the finger touch f3, as well. If the electrode A instead is paired with an electrode C, then force will be applied to the finger touch f2. While completely independent control is not possible with this arrangement, tri-intersection still provides some benefits. If, for instance, the electrodes A and B are paired, then the finger touch f2 is unaffected and the finger touch f3 experiences only half the force experienced by the finger touch f1 because there is only one, not two active electrodes underneath it (note the emphasis of the case in which the finger touches f2 and f3 experience lower forces than the finger touch f1, as higher forces are relatively easy to achieve since the finger touches f2 and f3 each can be addressed by two independent electrodes).

Other approaches to the situation shown in FIG. 12 are: use an electrode A and, as a second electrode, another one that is parallel to A; or, use a quad-intersection or higher-intersection geometry.

In addition, it should be understood that electrostatic haptic effects are normally experienced only when a finger is moving, so a situation like that in FIG. 12 will not persist. Finally, it should be understood that the ability of a person to distinguish a haptic sensation on one finger from that on another is limited, depending on the type of stimuli. As such, it is not always necessary to achieve complete independent control.

Simultaneous Sensing and Actuation with Mirrored Electrodes

In the methods taught herein, the front or top surface electrodes (haptic devices) are involved in both sensing and actuation (haptics). It is of course desirable to sense finger locations at the same time that haptic effects are being applied. Moreover, it is desirable that haptics not affect the quality of the sensing. Both of these goals are achieved by proper time sequencing.

When haptics is not in use, the front or top surface electrodes are normally not driven (in other words, the switches shown in FIG. 7b are open). When this is the case, it is straightforward to measure either the self-capacitance of a bottom surface electrode or the mutual capacitance of any pair of electrodes using any of a number of techniques known in the art. For instance, self-capacitance can be measured using a relaxation oscillator technique and measuring the oscillator frequency, which would typically be on the order of 1 MHz.

If it becomes necessary to produce a haptic effect, the switches in FIG. 7b would be closed long enough to charge up the finger capacitance $C_f$. As discussed earlier, this would require typically 1-10 μs. During this interval, sensing on the mirrored bottom surface lines of electrodes would be suspended and instead those lines would be grounded. At the end of this interval, sensing would commence. Sensing could continue for up to another 90 μs while still maintaining a haptic switching loop of 10 kHz, which is typical for electrostatics. Of course, not all electrodes can be queried in parallel. Instead, sensing would be multiplexed. Up to 100 sequential sensing queries could be completed while maintaining a reasonable multi-touch sensing rate of 100 Hz.

Alternatively, the charging of the top surface electrodes can be done by injecting an amount of charge or current onto them, rather than by connecting them intermittently to a voltage source as described just previously. The distinction is one of impedance; the alternate method maintains the high impedance state of the top surface electrode (due to haptic actuation) high at all times, with the consequence that signals (for sensing) originating in the lower surface electrodes can still have their effect without being distracted by the actuation.

From the foregoing description, it will be appreciated that several additional aspects may be ascertained from this disclosure when a touch interface uses mirrored electrodes.

For instance, in another aspect, the touch interface may further comprise a strong capacitive coupling between each respective surface haptic device connected to the front surface of the substrate and each respective sensing device aligned therewith and connected to the rear surface of the substrate.

In a further aspect, the touch interface may have the pattern of the one or more surface haptic devices be identical to the pattern of the one or more sensing devices.

In another aspect, the touch interface may use surface haptic devices that are transparent, or that further include an electrode and a protective layer, where the protective layer may be transparent and/or may be made of a dielectric material.

I still a further aspect, the touch interface may use a substrate that is planar or curved, and the substrate may be transparent, such as in the form or a sheet of glass or plastic.

In another aspect, the touch interface may have the haptic devices provide a haptic effect that is a change in friction and/or is independently controllable at more than one touch location.

In a further aspect, the touch interface may include a device that provides measurements of positions of more than one touch location.

In still another aspect, the touch interface may include electrical signals that are sent to at least one of the one or more surface haptic devices to produce a haptic effect, and the electrical signals may be sent to at least one of the one or more sensing devices to measure a touch location.

In a further aspect, the touch interface may include sensing devices that remain functional when the one or more surface haptic devices is damaged.

In another aspect, the touch interface may include one or more surface haptic devices and one or more sensing devices that are arranged in substantially similar and aligned patterns with each presenting an array having two or more lines of different electrodes that present intersection locations.

In still a further aspect, the touch interface may include one or more surface haptic devices and one or more sensing devices that are arranged in substantially similar and aligned patterns presenting an array having three lines of different electrodes that present a tri-intersection pattern. In a first further related aspect, the tri-intersection may provide disambiguation of ghost images of touch locations relative to actual finger touch locations when the touch interface is used with multi-finger sensing. In a second further related aspect, the tri-intersection may provide disambiguation of at least one finger touch location of a first individual relative to at least one finger touch location of a second individual when the touch interface is used with multi-user sensing.

Simultaneous Sensing and Actuation with Only One Set of Electrodes

The technique of mirrored electrodes is advantageous because it ensures that sensing can be accomplished even if the front surface electrodes are compromised by one or more scratches. If scratches are unlikely to occur, then it may be desirable to use only one set of electrodes—those on the touch surface, to accomplish sensing and actuation. Using the techniques taught here, it is still possible to do so. In particular, the problem of disambiguating real touch locations from ghost locations may still be resolved by the methods taught here, and simultaneous sensing and actuation may still be achieved by proper timing of the haptic and sensing signals.

From the foregoing description, it will be appreciated that several additional aspects may be ascertained from this disclosure when a touch interface uses one or more electrodes connected to the front surface of a substrate that are used as one or more haptic devices and sensing devices.

For instance, in another aspect, the touch interface may include electrodes on the front surface that provide an electrostatic force, and further, the electrostatic force may have a magnitude that can be modulated.

In another aspect, the touch interface may include that the one or more electrodes connected to the front surface of a substrate that present an array having two or more lines of different electrodes that present intersection locations, and further, the array may have three lines of different electrodes that present a tri-intersection pattern, which in turn may present a touch location that is associated with a finger engaging three different electrodes within the tri-intersection pattern.

In further aspect, the touch interface may include that the electrodes connected to the front of the substrate are capable of providing multi-point haptics.

Simultaneous Sensing and Actuation Using Only Front Surface Electrodes

The technique of mirrored electrodes is important because it ensures that sensing can be accomplished even if the front surface is compromised by one or more scratches. If scratches are unlikely to occur or are self-healing or easily repaired, then it may be desirable to use only one set of electrodes—those on the touch surface—to accomplish sensing and actuation. Using the techniques taught herein, it is still possible to do so. In particular, the problem of disambiguating real touch locations from misidentifications or ghost locations may still be resolved by the methods taught herein, and simultaneous sensing and actuation may still be achieved by proper timing of the haptic and sensing signals. The techniques of front surface simultaneous sensing and actuation are described further herein.

Challenges Presented by Front Surface Sensing and Simultaneous Actuation

A key advantage of front surface sensing is that only a single plane of electrodes is needed, reducing manufacturing costs. Moreover, as has been emphasized, there is a much stronger capacitive coupling from a front surface electrode to the finger, than from a rear surface electrode to the finger. Thus, front surface electrodes provide very large self-capacitance signals when touched by a finger, and therefore, very high Signal to Noise Ratio (SNR) compared to conventional rear surface methods. This signal can be detected by any of a number of methods known in the art, such as by measuring the current or charge (integral of current) needed to raise the electrode to a particular voltage. The high SNR means that a reliable signal can be obtained in a single measurement or a small number of measurements, instead of a large number of measurements averaged together, as is commonly the case for rear surface sensing. One consequence of this is that the time required to measure all of the electrodes on the top surface of a substrate of a touch interface or screen may be much less than typical for touch interfaces with rear surface sensing (e.g., in a preferred embodiment, a 200 mm by 300 mm area may be scanned in approximately 1 millisecond). Rapid sensing is useful in the design of low latency systems that respond very quickly to touch input. Also, low latency can be useful for updating the display quickly, updating audio, or updating haptic output.

In addition, it should be noted that it is generally desirable to measure the position of the finger to a resolution considerably greater than the pitch of the electrodes of the touch interface. For instance, a substrate of a touch interface device often may be manufactured with a pitch of two electrodes per centimeter, yielding an intrinsic resolution of 5 millimeters. It may be desirable, however, to measure the finger location with much finer resolution, such as 0.5 millimeters, or even less. This is accomplished by measuring the strength of the signals associated with the entire set of electrodes that are nearby the finger, and then combining these measurements to yield a high-resolution estimate. One typical combination scheme is to compute the centroid of those measurements. A good centroid measurement benefits from high SNR.

Front surface sensing, however, introduces certain new challenges that must be overcome. One challenge, as has been discussed, is disambiguating misidentifications or ghosts from actual finger touches in a multi-touch scenario. A second challenge is ensuring that the sensing scans do not produce a tactile or audible artifact. A third challenge is ensuring that adequate time is allocated for both sensing scans and production of a haptic output.

Multi-Touch Sensing

All methods discussed above (tissue resistivity, mutual capacitance of nearby, non-touched electrodes, computational, and tri-intersection) are still applicable. Here we teach additional techniques that take advantage of the large finger-to-electrode capacitance of front surface electrodes. We focus in particular on the problem of disambiguating two touches from the two ghosts that they create in a standard diamond-shaped electrode array (e.g., FIG. 3b). If this problem is solved, it is easily extended to a larger number of touches.

Consider the situation illustrated in FIG. 3b, in which two x-axis lines of electrodes and two y-axis lines of electrodes report a touch via self-capacitance measurement. A first question is whether there are in fact only two touches, or whether there might be three or four, as there are four possible touch locations. Due to the large self-capacitance signal of front-surface electrodes, it is possible to answer this question based on the magnitude of those signals. If more than one finger is touching the surface of the touch interface at a given electrode, its self-capacitance will increase, and this can be detected. This method can be used to test for the existence of ghosts, but cannot be used to disambiguate any ghosts from the actual finger touch locations.

The disambiguation measurement relies on the fact that there is a finite, albeit small, through-body impedance separating the two touches. A measurement strategy is devised which is sensitive to this impedance. In one embodiment, the following procedure is followed: 1) the two involved y-axis lines of electrodes are set to a known voltage $(+V_o)$ and then floated (i.e., isolated from the voltage source by a high-impedance switch); 2) one of the involved x-axis lines of electrodes is set to $+V_o$ and the other is set to $-V_o$; and 3) the charge on each of the floated y-axis lines of electrodes is measured. The y-axis line of electrodes having higher charge is associated with the x-axis line of electrodes set to $+V_o$, while the y-axis line of electrodes having lower charge is associated with the x-axis line of electrodes set to $-V_o$, thus disambiguating actual finger touches from misidentifications or ghosts.

In a preferred embodiment, the disambiguation relies on the same through-body impedance separating the touches, but decomposes the measurements further. Either each intersection can be measured, or at least two intersections along one row or column are measured and can be used to perform the disambiguation. The procedure is as follows: 1) the first of the two column electrodes is set to a known voltage (+Vo) and then floated (i.e. isolated from the voltage source by a high-impedance switch); 2) the first of the involved row electrodes is set to a known voltage -Vo; 3) the column electrode charge is now measured; 4) the second of the two column electrodes is set to a known voltage (+Vo) and then floated (i.e. isolated from the voltage source by a high-impedance switch); 5) the first of the involved row electrodes is set to a known voltage -Vo; 6) the column electrode charge is now measured; 7) repeat 1-6 for the second row is desired (provides full confirmation of result); 8) normalize the data for comparison using data measured with the normal self-capacitance measurement; and 9) compare the charge difference between the two columns to determine which crossing has the finger (the one with the lower charge).

These methods work due to the finite through-body impedance that ensures that the x-axis line of electrodes induce greater charge on the y-axis line of electrodes where a finger touch actually occurs.

Another way to disambiguate ghosts from real finger touches, when two fingers are in contact with the substrate, is described next. Recall that with two fingers touching the surface, the capacitance of two x-axis lines of electrodes and two y-axis lines of electrodes are increased, and it is not obvious which x-axis line of electrodes should be paired with each y-axis line of electrodes. However, considering the two x-axis lines of electrodes first, the finger touches one x-axis line of electrodes at a distance closer to the edge by which the electrode is connected to circuitry, and the other finger touches the other x-axis line of electrodes father from that edge. This difference in distance shows up too in the distance between the two y-axis lines of electrodes that are touched. A consequence of the different distance of the finger along an x-axis line of electrodes is that there is more series resistance from the circuitry (via the edge connector) to the more distant diamond-shaped electrode on its x-axis line of electrodes. In the case of a diamond electrode pattern (FIG. 3), the additional series resistance stems principally form the high resistance "bridges" between diamonds. Thus, when an electrode is set to charging, an RC charging circuit is established, with a C primarily reflecting the finger touching the electrode and the R primarily reflecting the number of bridges. The RC time constant can be used to determine if it is the farther or the nearer apparent finger along that electrode, that is the real finger touch.

In a preferred embodiment such an electrode is charged briefly in a manner not to bring it to its full state of charge (full voltage). Such a duration might be 1 microsecond. Then, after a pause of, say 5 microseconds, another charging interval is applied. The current or charge that moves in the second interval reveals the extent to which the first brief interval was inadequate. More series resistance R reflects a real finger touch that is farther from the electronics and the connector.

Undetectable Sensing

It is desirable that a finger position sensor be able to measure finger locations without creating detectable artifacts, such as audible noise or tactile feeling. At the same time, in order to minimize the complexity of the sensing and actuation electronics, it is desirable to use the same voltage levels for sensing as for actuation. This sets up an inherent conflict because actuation should be tactilely detectable, while sensing should not.

One solution to this conflict is to base both actuation and sensing on very brief pulses. In a preferred embodiment, the voltage pulse for a given electrode (e.g., the y-axis line of electrodes in FIG. 3a, running top to bottom) would have the form illustrated in FIG. 13a, which shows a single pulse of voltage on a single electrode. Prior to time $t=t_1$ the electrode would be floating. At $t=t_1$, the voltage would be set to $+V_o$. In a preferred embodiment, $V_o=70$ volts, although lower or higher voltages could be used. At $t=(t_1+t_2)/2$, or some other time between $t_1$ and $t_2$, the voltage would be set to $-V_o$. And at $t=t_2$, the voltage would be allowed to float again. In a preferred embodiment, the time period $(t_2-t_1)$ would be 50 microseconds, although shorter or longer periods could be used. A key point is that, due it its short duration, a single pulse is difficult for a user to detect. Nonetheless, the pulse is adequate for sensing. Sensing is accomplished by measuring the absolute value (because the pulse has both positive and negative segments) of the current or charge flowing to the electrode. In order to measure the finger location at 100 times per second (more frequently than most commercial touch screens), it is necessary to repeat this pulse on a given electrode once every 10 milliseconds (10,000 microseconds). Thus, out of each 10,000 microsecond period, the pulse would be active for only 50 microseconds, or one two-hundredth of the time. This very small duty cycle ensures that any haptic artifact is extremely small. Nonetheless, humans are very sensitive to vibrations in the range of 100 Hz to 300 Hz. If, for a particular system, sensing scans are detectable by the user, then a solution is to increase the rate of the scans to 500 Hz or greater. While the duty cycle is somewhat greater, humans cannot easily feel such high frequencies. Another solution is simply to make the pulses even shorter.

In addition to using brief pulses and a low duty cycle, the order of scanning can be adjusted to improve the feeling of the sensing. If the short pulses are also spatially diverse the finger is not affected by adjacent electrodes being pulsed in sequence (which the finger may feel cumulatively), but rather the pulses become further apart, and are not as detectable.

Since it is clear that shorter measurement pulses result in a less noticeable haptic effect, and both positive and negative voltage pulses have the same haptic effect, a further way to reduce the haptic effect of the pulses is to drive the voltage to 0V when no haptic effect is desired. As we described earlier, floating an electrode for some period of time would eventually cause a return to 0V, but by actively driving it to zero, the effect of a measurement pulse can be further reduced. This ability to drive to zero also opens up the possibility of pulse width modulation (PWM) control for the haptics pulses as well. The pulses can be further modulated in length and number to create different levels of haptic effect.

To generate strong haptic effects, one approach is to use many pulses. For instance, to generate a strong 100 Hz effect, one could repeat a sequence of 100 50 microsecond pulses (which would take 5000 microseconds) followed by 5000 microseconds of no pulses. This would be perceived 100 times stronger than a 100 Hz sensing scan. However, the haptic effects may be strengthened in other ways, too. For instance, referring again to FIG. 3a, and assuming that the finger is located near the intersection of the y-axis line of electrodes (top to bottom) and the x-axis line of electrodes (left to right), equal and opposite pulses may be applied to the y-axis and x-axis lines of electrodes, as we have discussed elsewhere. This allows the field lines to be closed directly through the touch of the finger or fingertip and not through any other part of the body. Yet, another way to increase the strength of the haptic effect is to apply voltage to multiple electrodes simultaneously that are fully or partially under the user's finger. For instance, in accordance with the upper diagram in FIG. 13b, the voltage could be applied to the y-axis line of electrodes in FIG. 3a as well as one of its immediate neighbors, while in accordance with the lower diagram in FIG. 13b, the voltage could be applied to the x-axis line of electrodes and one of its immediate neighbors. Thus, FIG. 13b shows a single pulse of voltage on a first y-axis line of electrodes (upper diagram) and a single but inverted pulse of voltage on a second x-axis line of electrodes (lower diagram). Even larger numbers of electrodes could be recruited and utilized to increase the strength of the haptic effect further.

A different approach to undetectable sensing is to use a lower voltage for sensing than for haptics. For instance, in a preferred embodiment, $V_o=5V$ is used for sensing while $V_o=70V$ is used for actuation. The lower voltage can be combined with the techniques mentioned above to ensure that sensing is completely undetectable. This approach requires additional electronics to switch between the two different voltages.

Combining Sensing and Actuation

The number of electronic components necessary for sensing can be dramatically reduced if only one set of sensor electronics serves all of the electrodes. A consequence of taking this approach is that sensing and actuation must be carefully coordinated. To illustrate the coordination challenge, consider an actuation scenario as described above in which a haptic output is being generated by two x-axis lines of electrodes and two y-axis lines of electrodes. In addition, consider an approach to self-capacitance sensing based on measuring and integrating the current delivered to a given electrode (i.e., measuring the charge needed to raise the electrode to the voltage $V_o$; this amount of charge is highly sensitive to the presence of a finger). Because actuation in this scenario requires sending current to four electrodes simultaneously, and sensing requires integrating the current sent to each individual electrode (not just those involved in actuation), it is difficult to perform the actuation and sensing simultaneously, especially if there is only one current sensor serving all of the electrodes. Here we describe several ways to coordinate sensing and actuation.

Scheduler

Figure 13A:
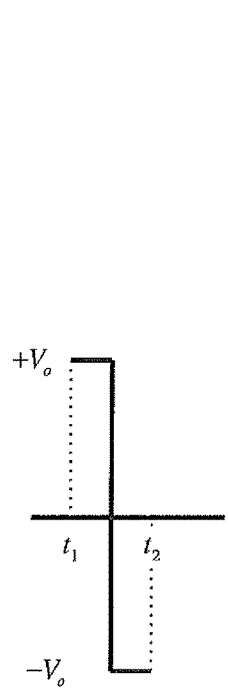
FIG. 13a is a diagram showing a single pulse of voltage on a single electrode.
Figure 13B:
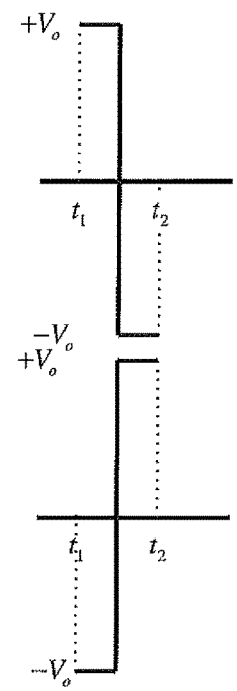
FIG. 13b is a diagram showing a single pulse of voltage on a first electrode and a single but inverted pulse of voltage on a second electrode.
Figure 14:
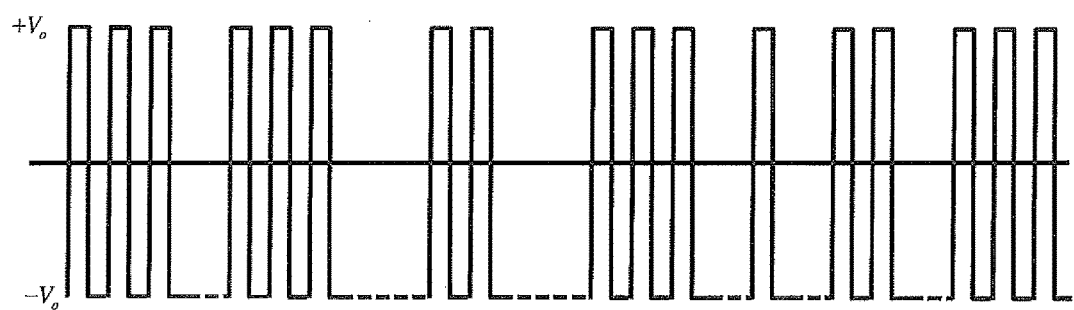
FIG. 14 is a diagram showing a voltage applied to a single electrode during a typical segment of a haptic output.

Most haptic actuation signals do not require that pulses of the sort shown in FIG. 13a be repeated continuously. For instance, a typical actuation signal is shown in FIG. 14 as the voltage applied to a single electrode during a typical segment of haptic output. There are numerous periods during which no actuation pulses are delivered. One strategy, therefore, is to deliver sensing pulses during these periods of no actuation. For this strategy to work, there must be sufficient periods of no actuation. For instance, if the touch interface or substrate presents 50 total lines of electrodes (e.g., 25 x-axis lines of electrodes and 25 y-axis lines of electrodes), and 50 microseconds are required to sense each line of electrodes, then 2.5 milliseconds will be required to scan the entire substrate. If it is further desired to update the sensing data at 100 Hz, then the sensing scan must be repeated every 10 milliseconds. This means that up to 7.5 milliseconds out of each 10 millisecond interval is available for actuation. Thus, any actuation signal that has less than a 75% duty cycle can be produced. The controller will first schedule haptic output as necessary to produce the desired effects, then schedule sensing pulses during any periods of no actuation.

Note that, in the embodiment shown in FIG. 14, the electrode voltage may be set to $+V_o$ or $-V_o$, or it may be floated (indicated by dashed lines). Because pulses are very short, the perceived haptic output is related to the density of pulses. When pulses are frequent (dense), the strength of sensation is increased. A scheduler can insert sensing pulses (on other electrodes or on this same electrode) during periods when the electrode voltage is floating.

Also, rather than pulse number modulation, with the addition of the ability to drive the electrode to 0V, it is also possible to perform pulse width modulation (PWM) where every pulse is present, but at a variable length which is used to vary the haptic effect. This results in a much better effect and provides a wider range of possible effects. This is used in the preferred embodiment to vary the strength of the haptic effect.

Differential Measurements

It is possible to measure the current associated with any pulse, whether that pulse is intended for sensing or actuation. As a consequence, it is possible to make a measurement for each electrode by actuating that electrode at the same time as any other electrodes being used for actuation and measuring the cumulative charging current. That portion of the measurement due to actuation electrodes then may be subtracted from the total, leaving only the portion due to the sensed electrode.

In a first embodiment, actuation will always involve pairs of pulses (e.g., the minimum element of any sequence of pulses, instead of being the pulse shown in FIG. 13a, it would be a concatenation of two such pulses). Note that these pulses would normally be applied to at least one x-axis line of electrodes and one y-axis line of electrodes although, as has been noted, additional x-axis and y-axis lines of electrodes may be actuated as well. In the first of the two pulses, no additional electrodes will be actuated, but a "baseline" current measurement will be made. In the second pulse, one additional electrode will be actuated and current will again be measured. The difference of these two measurements would serve as the sensing signal for that additional electrode. In the event that a measurement is needed for one of the electrodes being used for haptic output, that electrode will not be actuated in the second pulse. Again the difference will serve as the sensing signal. With this method, assuming that individual pulses are 50 microseconds long, a touch interface containing 50 lines of electrodes could be scanned in 5 milliseconds, which would be sufficient for a 200 Hz update of the sensed finger position.

It is possible to achieve an even higher scan rate, however. This can be accomplished by combining the differential measurement method presented above with shorter sensing pulses. While 50 microseconds is a suitable pulse duration for haptic actuation, sensing can typically be accomplished more rapidly. The physical limit to sensing speed is the RC time constant associated with charging each line of electrodes. This time constant is typically in the range of 1 to 10 microseconds in the presence of a finger (even shorter when no finger is present). Thus, multiple sensing scans can be accomplished during each individual haptic actuation pulse.

In a preferred embodiment, which we call "actuate-float-sense" (AFS), simultaneous sensing and actuation proceeds as follows: 1) a haptic actuation pulse begins (at a time denoted t=0 microseconds) by connecting the involved electrodes to a $+V_o$ voltage source (those electrodes begin to charge up); 2) after approximately 8 microseconds, the electrodes will be fully charged and the current flowing to them will be quite small, at this point in time those electrodes may optionally be disconnected from the $+V_o$ voltage source and left to have their voltage float; 3) at t=8 microseconds, the first electrode to be sensed is connected to the $+V_o$ voltage source, additional current will flow in order to charge this electrode, and this current is measured and integrated for 8 microseconds; 4) at t=16 microseconds, the second electrode to be sensed is connected to the $+V_o$ voltage source, additional current will flow in order to charge this electrode, and this current is measured and integrated for 8 microseconds; 5) at t=25 microseconds, the charged electrodes are disconnected from the $+V_o$ voltage supply and those involved in haptic actuation are connected to the $-V_o$ voltage supply, after about 8 microseconds, these electrodes will be fully charged, and at this point in time those electrodes may optionally be disconnected from the $-V_o$ voltage source and left to have their voltage float; 6) at t=33 microseconds, the first electrode to be sensed is connected to the $-V_o$ voltage source, additional current will flow in order to charge this electrode, and this current is measured and integrated for 8 microseconds; 7) at t=41 microseconds, the second electrode to be sensed is connected to the $-V_o$ voltage source, additional current will flow in order to charge this electrode, and this current is measured and integrated for 8 microseconds; and 8) at t=50 microseconds, the cycle is completed, and another haptic actuation cycle begins. In the next cycle, a third and fourth electrode are sensed.

This preferred embodiment allows each electrode to be sensed at both positive and negative voltages, minimizing the effect of any biases due to charges already present on the human body, and it allows two electrodes to be sensed during each haptic actuation cycle. Thus, a panel containing 50 electrodes can be scanned in 1.25 milliseconds, or at 800 Hz. This rate could be doubled again if the first two electrodes were measured only on the $+V_o$ part of the actuation pulse, while a third and fourth electrodes were measured on the $-V_o$ part of the actuation pulse.

In the event that one of the electrodes to be sensed is also one of those involved in haptic actuation, the steps described above are modified slightly. After the haptic actuation electrodes have reached $+V_o$ and their voltages are floated, then the one to be sensed is (at t=8 microseconds or t=16 microseconds) connected to the $-V_o$ supply and current is measured. A similar strategy is adopted once the haptic actuation electrodes have reached $-V_o$. This will produce little to no change in the overall haptic output because the friction change felt by the user depends on the square of the voltage; moreover, the timing difference between the sensed and non-sensed pulses are too fast to be perceived.

AFS also can be performed in any order and in another embodiment, the sensing is performed first before the actuation to provide one better measurement and to reduce the complexity of the implementation. However, this usually means that due to other restrictions, multiple sensing passes during one half-cycle are not possible.

A further improvement to AFS is to be able to drive the electrode to 0V. Being able to drive to 0V, AFS with PWM often becomes actuate, zero, sense (AZS). Combining PWM with AFS/AZS results in a set of PWM lengths that are difficult to create due to the fact that the measurement does take time from the cycle. During the measurement time, it may not be possible to switch any of the outputs. It is possible to produce the full set of PWM lengths by varying when the measurement takes place relative to the actuation. This involves allowing the measurement to occur either while actuation is occurring for long PWM cycles, or while actuation is not occurring during short PWM cycles. In the preferred embodiment, the measurement occurs when actuation is not occurring except when the full 100% PWM pulse is occurring.

Overall, PWM with AZS allows for better haptic effects and therefore the implementation is dependent on this tradeoff. Performing AZS also means that sensing can be done from a 0V reference, and this is also useful in reducing the haptic effect from the measurements.

If a 0V output is not available, it is possible to perform a "best effort" attempt to discharge the electrode to 0V by driving the opposite voltage for a short period of time after the primary actuation or measurement pulse is completed and the electrode is floating. This allows for many of the benefits of PWM and undetectable sensing, but cannot provide measurements from a 0V reference. It has the advantage of not requiring a complex implementation in the circuitry to have a 0V output to each electrode. It has the further disadvantage of the control complexity for the timing and scheduling of pulses.

Adaptive Sensing

In order to further increase the rate of sensing, while also reducing power consumption, an adaptive sensing scheme may be used. In an adaptive sensing scheme, fewer and less frequent pulses are used until a finger is located. For instance, only every second x-axis line of electrodes and every second y-axis line of electrodes can be scanned since a finger will cover more than one electrode per axis. Moreover, these measurements can be made at a reduced rate, such as 50 Hz. Once a finger is located, however, all of the electrodes near to the finger location may be scanned at a high rate. This will enable high speed, low latency measurement of finger position. Below, we describe this method in greater detail.

There are three regimes or methods relevant to sensing with actuation, two of which have been treated in detail in the foregoing. The first regime applies to electrodes which are being touched but which are not involved in haptic actuation. This situation requires undetectable sensing, as has been discussed. The second regime applies to electrodes that are being touched and are involved in haptic actuation. This has also been discussed. The third regime applies to electrodes that are not currently being touched. It is necessary to find out promptly if a finger does begin to touch one of these electrodes. In fact by interrogation (measuring the capacitance) of an un-touched electrode, we can determine even the approach of a finger to touching the electrode, before actual touching occurs. When an electrode is not being touched, any voltages imposed on the electrode for purposes of sensing its capacitance, can have no effect on haptic perception nor on the emission of audible noise. Therefore, there is a fast and power efficient way to test all the untouched electrodes, to detect the onset of a touch. Periodically, for instance once every 10 milliseconds or every 1 millisecond, all the electrodes thought to be untouched can be pulsed, together. Untouched electrodes have very low capacitance, while, due to the benefits of front surface measurements, the addition of even part of a fingertip touching even one electrode, will significantly change the capacitance of the whole set of electrodes. Thus, in a single measurement the arrival of a new finger to any previously untouched electrode can be detected.

To rapidly determine which electrode or electrodes have been newly touched, a binary search of the x-axis lines of electrodes and then of the y-axis lines of electrodes can be performed. For instance, if there are 32 x-axis lines of electrodes that were previously untouched, in just five tests the one x-axis line of electrodes that is newly touched can be isolated. In our preferred embodiment, every line of electrodes (x-axis or y-axis) is independently tested as a candidate to be newly touched. Because of the brevity of the interrogation sequence, and because the finger is detected when it has just recently arrived in contact with the touch surface or even before this contact or touching is established, the charges and discharges occurring during interrogation will have no perceptible haptic effect on the finger.

To make this full interrogation rapidly without interrupting the regularity of haptic actuation for those other electrodes that are being haptically actuated, it is only necessary to borrow or utilize a few microseconds during the actuation cycle of the haptically actuated electrodes. This can be accomplished with the above-described AFS method.

From the above disclosure, it will be apparent that touch interface devices constructed in accordance with this disclosure may provide multi-point haptics while including a number of advantages over the prior art. The devices may exhibit one or more of the above-referenced potential advantages, depending upon the specific design and configuration chosen.

It will be appreciated that a touch interface of a surface haptic device having multi-point haptics in accordance with the present disclosure may be provided in various configurations. Any variety of suitable materials of construction, configurations, shapes and sizes for the components and methods of connecting the components may be utilized to meet the particular needs and requirements of an end user. It will be apparent to those skilled in the art that various modifications can be made in the design and construction of such devices without departing from the scope or spirit of the claimed subject matter, and that the claims are not limited to the preferred embodiments illustrated herein.

It is to be understood that the above description is intended to be illustrative, and not restrictive. For example, the above-described examples or embodiments (and/or aspects thereof) may be used individually or in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are intended as examples. Many other embodiments will be apparent to one of ordinary skill in the art upon reviewing the above description. The scope of the one or more embodiments of the subject matter described herein should, therefore, be determined with reference to the appended claims, along with the full scope of equivalents to which such claims are entitled. In the appended claims, terms such as "including" and "having" are used as the plain-English equivalents of the respective terms "comprising" and "wherein." Moreover, in the following claims, use of terms such as "first," "second," and "third," etc. may be used merely as labels, and are not intended to impose numerical requirements on their objects. Further, the limitations of the following claims are not written in means-plus-function format and are not intended to be interpreted based on 35 U.S.C. 112, sixth paragraph, unless and until such claims limitations expressly use the phrase "means for" followed by a statement of function void of further structure.

This written description uses examples to disclose several embodiments of the inventive subject matter, and also to enable a person of ordinary skill in the art to practice the embodiments disclosed herein, including making and using any devices or systems and performing any incorporated methods. The patentable scope of the subject matter may be defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

As used herein, an element or step recited in the singular and proceeded with the word "a" or "an" should be understood as not excluding plural of said elements or steps, unless such exclusion is explicitly stated. Furthermore, references to one example of embodiment of the presently described inventive subject matter are not intended to be interpreted as excluding the existence of additional examples or embodiments that also incorporate the recited features. Moreover, unless explicitly stated to the contrary, claims "comprising," "including," or "having" an element or a plurality of elements having a particular property may include additional such elements not having that property.

What is claimed is:

1. A touch interface having simultaneous sensing and actuation comprising:
    an insulating substrate;
    a plurality of electrodes connected to a front surface of the substrate and being arranged in a pattern;
    an electronic controller configured to connect each electrode to a sensing voltage and an actuating voltage;
    said electronic controller configured to produce a haptic effect by applying the actuating voltage to said electrodes, wherein the actuating voltage comprises at least one actuating pulse, wherein the electronic controller is configured to strengthen the haptic effect by modulating at least one of a duration of the at least one actuating pulse, frequency of the at least one actuating pulse, and number of actuating pulses; and
    said electronic controller configured to measure locations of touch points by applying the sensing voltage to said electrodes, wherein a level of the sensing voltage and a level of the actuating voltage are substantially the same, wherein the sensing voltage comprises at least one sensing pulse, wherein the electronic controller is configured to reduce or eliminate a user's perception of the sensing voltage by modulating at least one of a duration of the at least one sensing pulse, frequency of the at least one sensing pulse, and number of sensing pulses, wherein the haptic effect is more perceptible to a user than the sensing voltage.

2. The touch interface of claim 1 wherein the sensing and actuating voltage are applied to the electrodes with positive and negative voltage components.

3. The touch interface of claim 2 wherein the actuating voltage is applied by the electronic controller to the electrodes at the touch points in pulse width modulated pulses.

4. The touch interface of claim 1 wherein the sensing and actuating voltages include a positive voltage and a negative voltage applied alternately.

5. The touch interface of claim 1 wherein the electrodes include a protective layer.

6. The touch interface of claim 5 wherein the protective layer is transparent.

7. The touch interface of claim 5 wherein the protective layer is made of a dielectric material.

8. The touch interface of claim 1 wherein the sensing voltage is applied by the electronic controller to each electrode in a single pulse having a duration less than 100 microseconds, and wherein the electronic controller is configured to scan the plurality of electrodes at a rate of 500 Hz or greater.

9. The touch interface of claim 1 wherein the actuating voltage is applied by the electronic controller to each electrode in at least 50 pulses, wherein each pulse is at a length of 50 microseconds or greater, and wherein each pulse is at a rate of 100 Hz or greater to create the haptic effect.

10. The touch interface of claim 1 wherein the haptic effect provided by the electrodes is an increase in friction.

11. The touch interface of claim 1 wherein the haptic effect is independently controllable at more than one touch location.

12. The touch interface of claim 1 wherein the device provides measurements of positions of more than one touch location.

13. The touch interface of claim 1 wherein the one or more electrodes are arranged in an aligned pattern presenting an array having two or more lines of different electrodes that present intersection locations.

14. The touch interface of claim 1 wherein the sensing voltage is applied by the electronic controller to each electrode in a single pulse having a duration less than 100 microseconds.

15. The touch interface of claim 14 wherein the electronic controller is configured to drive the single pulse to zero after being applied.

16. The touch interface of claim 1 wherein the electronic controller is configured to scan the plurality of electrodes at a rate of 500 Hz or greater.

17. The touch interface of claim 1 wherein the actuating voltage is applied by the electronic controller to the electrodes at the touch points in a sequence of a series of pulses during a first period and a second period without pulses.

18. A method of using a plurality of electrodes disposed on a front surface of an insulating substrate of a touch interface arranged in a pattern to simultaneously produce haptic effects on the substrate and measure finger locations relative to the substrate, the method comprising:
    providing a controller that is connect to each electrode;
    applying at least one sensing voltage pulse to each of the electrodes to measure locations of touch points, wherein the electronic controller reduces or eliminates a user's perception of the sensing voltage pulse by modulating at least one of a duration of the at least one sensing voltage pulse, frequency of the at least one sensing voltage pulse, and number of sensing voltage pulses;
    applying at least one actuating voltage pulse to the touch points to produce the haptic effect, wherein the electronic controller strengthens the haptic effect by modulating at least one of a duration of the at least one actuating voltage pulse, frequency of the at least one actuating voltage pulse, and number of actuating voltage pulses, wherein the haptic effect is more perceptible to a user than the at least one sensing voltage pulse and wherein a level of the at least one sensing voltage pulse and a level of the at least one actuating voltage pulse are substantially the same.

19. A touch interface having simultaneous sensing and actuation comprising:
    an insulating substrate;
    a plurality of electrodes connected to a front surface of the substrate and being arranged in a pattern;
    an electronic controller configured to connect each electrode to a sensing voltage and an actuating voltage;

wherein the actuating voltage comprises a plurality of actuating pulses, wherein said electronic controller is configured to produce a haptic effect by applying the plurality of actuating pulses to said electrodes, wherein the plurality of actuating pulses comprises at least 50 actuating pulses, wherein each actuating pulse is at a duration of 50 microseconds or greater, and wherein each pulse is at a rate of 100 Hz or greater; and wherein the sensing voltage comprises a single sensing pulse, wherein said electronic controller configured to measure locations of touch points by applying the single sensing pulse to each electrode, wherein the single sensing pulse has a duration of 100 microseconds or less and a rate of 500 Hz or greater, and wherein a level of the sensing voltage is substantially the same as a level of the actuating voltage.

* * * * *